(12) United States Patent
Wang et al.

(10) Patent No.: US 10,502,903 B1
(45) Date of Patent: Dec. 10, 2019

(54) FIBER OPTIC ADAPTER WITH AN INTERNAL SHUTTER ASSEMBLY AND INTEGRATED ALIGNMENT SLEEVE HOLDER

(71) Applicant: Leviton Manufacturing Co., Inc., Melville, NY (US)

(72) Inventors: Hua Wang, Mill Creek, WA (US); Scott Richard Hopper, Melville, NY (US)

(73) Assignee: LEVITON MANUFACTURING CO., INC., Melville, NY (US)

( * ) Notice: Subject to any disclaimer, the term of this patent is extended or adjusted under 35 U.S.C. 154(b) by 0 days.

(21) Appl. No.: 16/130,667

(22) Filed: Sep. 13, 2018

(51) Int. Cl.
*G02B 6/38* (2006.01)

(52) U.S. Cl.
CPC ......... *G02B 6/3825* (2013.01); *G02B 6/3839* (2013.01); *G02B 6/3849* (2013.01); *G02B 6/3893* (2013.01)

(58) Field of Classification Search
CPC .. G02B 6/3825; G02B 6/3849; G02B 6/3839; G02B 6/3893
See application file for complete search history.

(56) References Cited

U.S. PATENT DOCUMENTS

| | | | |
|---|---|---|---|
| 5,282,259 A * | 1/1994 | Grois | G02B 6/3843 385/147 |
| 5,325,454 A | 6/1994 | Rittle et al. | |
| 5,883,995 A * | 3/1999 | Lu | G02B 6/3807 385/60 |
| 6,108,482 A | 8/2000 | Roth | |
| 6,352,375 B1 | 3/2002 | Shimoji et al. | |
| 6,375,363 B1 | 4/2002 | Harrison et al. | |
| 6,595,696 B1 | 7/2003 | Zellak | |
| 6,688,780 B2 | 2/2004 | Duran | |
| 7,153,041 B2 | 12/2006 | Mine et al. | |
| 7,198,409 B2 * | 4/2007 | Smith | G02B 6/3849 385/53 |
| 8,186,890 B2 * | 5/2012 | Lu | G02B 6/3807 385/60 |
| 8,821,031 B2 * | 9/2014 | Lin | G02B 6/3825 385/59 |
| 9,453,963 B2 * | 9/2016 | Sato | G02B 6/241 |
| 9,494,746 B2 * | 11/2016 | Sanders | G02B 6/3825 |
| 9,632,256 B2 * | 4/2017 | Yang | G02B 6/3825 |

(Continued)

*Primary Examiner* — Ellen E Kim
(74) *Attorney, Agent, or Firm* — Davis Wright Tremaine LLP; George C. Rondeau, Jr.; Heather M. Colburn

(57) ABSTRACT

A fiber optic adapter with a housing defining an open-ended through-channel having a first port at one end and a second port at another end. The first and second ports being configured to receive first and second fiber optic connectors, respectively. The adapter may include a shutter door and a biasing member. The shutter door automatically transitions to an open position when the first connector is inserted into the first port and is automatically transitioned to the closed position by the biasing member when the first connector is removed from the first port. The adapter may include a cover and an alignment sleeve. The cover has a cylinder positioned inside the through-channel of the housing. The cylinder has a bore in which the alignment sleeve is positioned. The alignment sleeve has an open-ended through-channel configured to receive first and second ferrules of the first and second connectors, respectively.

21 Claims, 19 Drawing Sheets

(56) References Cited

U.S. PATENT DOCUMENTS

| | | | | |
|---|---|---|---|---|
| 2010/0054665 A1* | 3/2010 | Jones | ................... | G02B 6/3825 |
| | | | | 385/59 |
| 2012/0321266 A1* | 12/2012 | Lin | ...................... | G02B 6/3825 |
| | | | | 385/134 |
| 2013/0272671 A1* | 10/2013 | Jones | ................... | G02B 6/3831 |
| | | | | 385/139 |
| 2015/0078710 A1* | 3/2015 | Sato | ...................... | G02B 6/241 |
| | | | | 385/78 |

* cited by examiner

FIBER OPTIC ADAPTER WITH AN INTERNAL SHUTTER ASSEMBLY AND INTEGRATED ALIGNMENT SLEEVE HOLDER

BACKGROUND OF THE INVENTION

Field of the Invention

The present invention is directed generally to adapters used to connect at least one fiber optic connector with a different fiber optic connector.

Description of the Related Art

Many different types of fiber optic connectors have been introduced into the market with industry standards having been developed around those fiber optic connectors that are most successful. Examples of such fiber optic connectors include the Lucent Connector ("LC"), Standard or Subscriber Connector ("SC"), ferrule connector or fiber channel ("FC"), and Straight Tip ("ST") type fiber optic connectors. Single optical fiber connectors typically include a ferrule having an optical fiber centrally disposed therein to terminate an end of an optical fiber. Often connectors are paired in a side-by-side arrangement, referred to as duplexed, in which one connector carries a transmitting optical signal, and the other connector carries a return optical signal. A duplexed connector includes a pair of ferrules configured to terminate the ends of a pair of optical fibers.

Fiber optic adapters are used to securely align a pair of fiber optic connectors to be mated. Fiber optic adapters are designed to align the respective ferrules and optical fibers therein, of a mated pair of fiber optic connectors in near perfect coaxial alignment. One of the key components of a fiber optic adapter is an alignment sleeve that holds and secures the mated ferrules to ensure concentric alignment of the ferrules and optical fibers. Proper alignment of fiber optic connectors within the fiber optic adapter is required to minimize optical signal degradation that may occur along the fiber optic transmission line due to misalignment of the ferrules and optic fibers therein.

A fiber optic adapter having a single alignment sleeve is referred to as a simplex fiber optic adapter while one including two alignment sleeves is referred to as duplex fiber optic adapter. A fiber optic adapter including a pair of duplex features is referred to as a quad fiber optic adapter.

Fiber optic adapters help minimize optical signal degradation along a fiber optic transmission line by protecting the mating surface of the optical fibers of the mated fiber optic connectors. Such protection is improved with the addition of shutters over the fiber optic connector ports of the fiber optic adapter that help reduce intrusion of particulate matter, such as dust, into the adapter that may damage or compromise the transmitting surfaces of mated optical fibers within a fiber optic adapter. Shuttered ports of a fiber optic adapter also reduce the risk of eye damage to an end user who may inadvertently look into a fiber optic connector port through which light signals are transmitted that may damage the user's eye(s).

Unfortunately, even a small degree of mis-alignment of mated optical fibers as well as contamination of the contacting surfaces of mated optical fibers within the adapter may cause optical signal degradation. This is particularly true for fiber optic adapters that do not have shutters to block contaminant intrusion into the fiber optic ports. Further, such adapters also pose greater risks of eye damage to end users due to the transmission of high powered light signals out of an un-shuttered port.

BRIEF DESCRIPTION OF THE SEVERAL VIEWS OF THE DRAWING(S)

Like reference numerals have been used in the figures to identify like components.

DETAILED DESCRIPTION OF THE INVENTION

Figure 1:
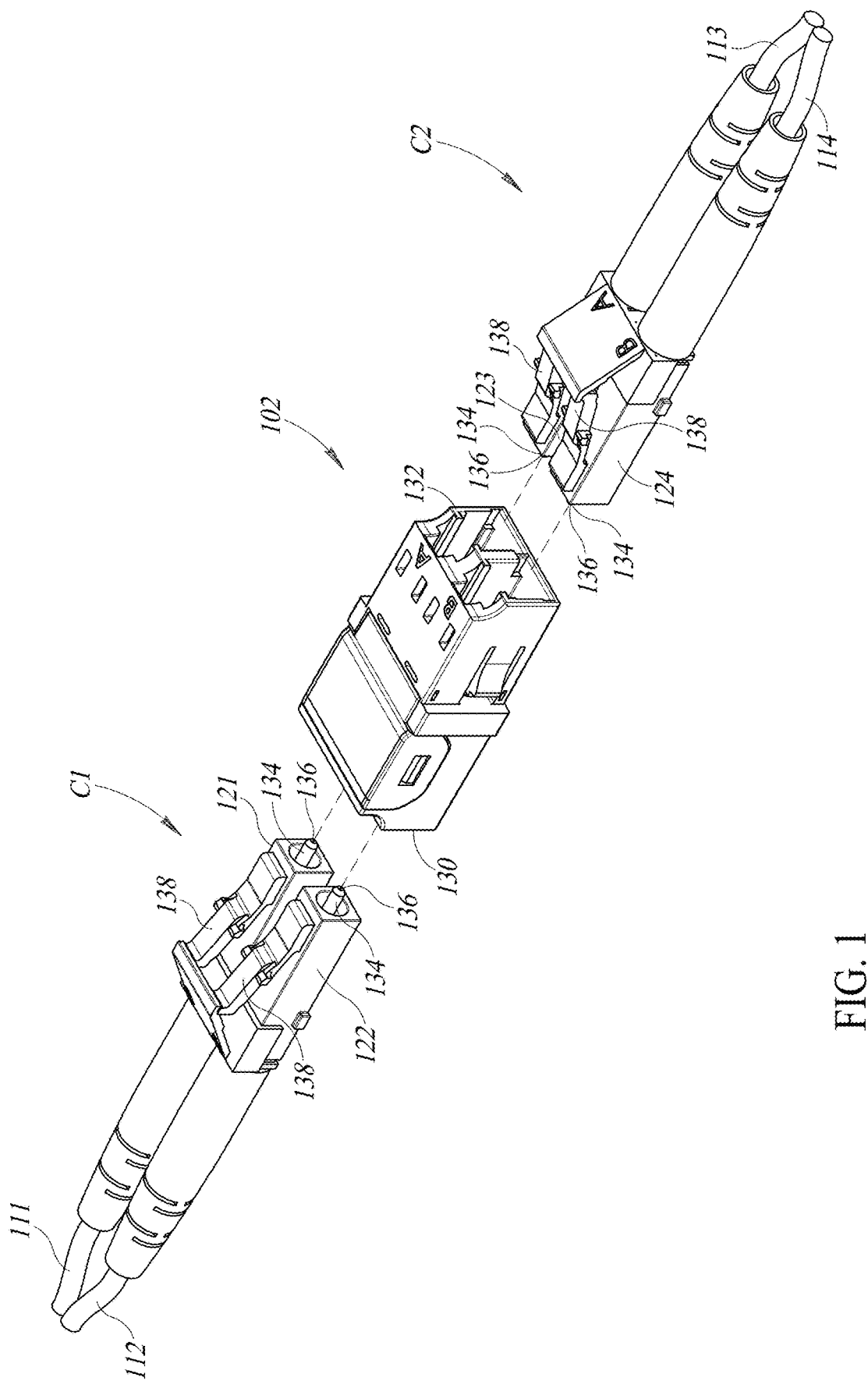
FIG. 1 is a partially exploded perspective view of a duplex fiber optic adapter and an opposing pair of duplexed fiber optic connectors.

FIG. 1 is a partially exploded perspective view of a duplex fiber optic adapter 102, a first duplexed fiber optic connector C1, and a second duplexed fiber optic connector C2. The first duplexed fiber optic connector C1 includes first and second fiber optic connectors 121 and 122 that terminate fiber optic cables 111 and 112, respectively. The second duplexed fiber optic connector C2 includes third and fourth fiber optic connectors 123 and 124 that terminate fiber optic cables 113 and 114, respectively.

The duplex fiber optic adapter 102 has a forward facing shutter end 130 configured to receive the first and second fiber optic connectors 121 and 122 and a backward facing non-shuttered end 132 opposite the shutter end 130. The backward facing non-shuttered end 132 is configured to receive the third and fourth fiber optic connectors 123 and 124.

In the ordinary course of use, the forward facing shutter end 130 is typically interfaced by an end user multiple times over the useful service life of the duplex fiber optic adapter 102 as it becomes necessary to reconfigure the fiber optic connectivity by re-inserting or replacing the first and second fiber optic connectors 121 and 122. On the other hand, the end user does not typically reconfigure the fiber optic connectivity of the backward facing non-shuttered end 132. Instead, referring to FIG. 3, the backward facing non-shuttered end 132 is typically interfaced by an installer when the duplex fiber optic adapter 102 is initially installed in a pass-through cassette or plate, such as a plate 106 having opening 104 that may be aligned with a longitudinal axis "L" of the duplex fiber optic adapter 102.

Returning to FIG. 1, the fiber optic connectors 121-124 may be substantially identical to one another. Each of the fiber optic connectors 121-124 includes a ferrule 134 with an end face 136. Each of the fiber optic connectors 121-124 may include an outwardly extending latch arm 138. By way of a non-limiting example, each of the fiber optic connectors 121-124 may be implemented as an LC fiber optic connector or, alternatively, a fiber optic connector having a different form factor, such as a SC fiber optic connector or a ST fiber optic connector.

By way of non-limiting examples, the duplex fiber optic adapter 102 may be designed to comply with the physical parameters defined by industry intermateability standards for fiber optic connectors and adapters including, but not limited to, the Mechanical Reference Plane ("MRP") and Optical Reference Plane ("ORP") set forth in at least one of the following standards:
  1. IEC 61754-20, titled Fiber optic interconnecting devices and passive components—Fiber optic connector interfaces—Part 20: Type LC connector family; and
  2. TIA/EIA-604 FOCIS-10, titled Fiber Optic Connector Intermateability Standard—Type LC.

As used herein, the initials "IEC" are an abbreviation of "International Electrotechnical Commission," the initials "TIA" are an abbreviation of "Telecommunications Industry Association," the initials "EIA" are an abbreviation of "Electronic Industries Alliance," and the initials "FOCIS" are an abbreviation of "Fiber Optic Connector Intermateability Standards."

Figure 4:
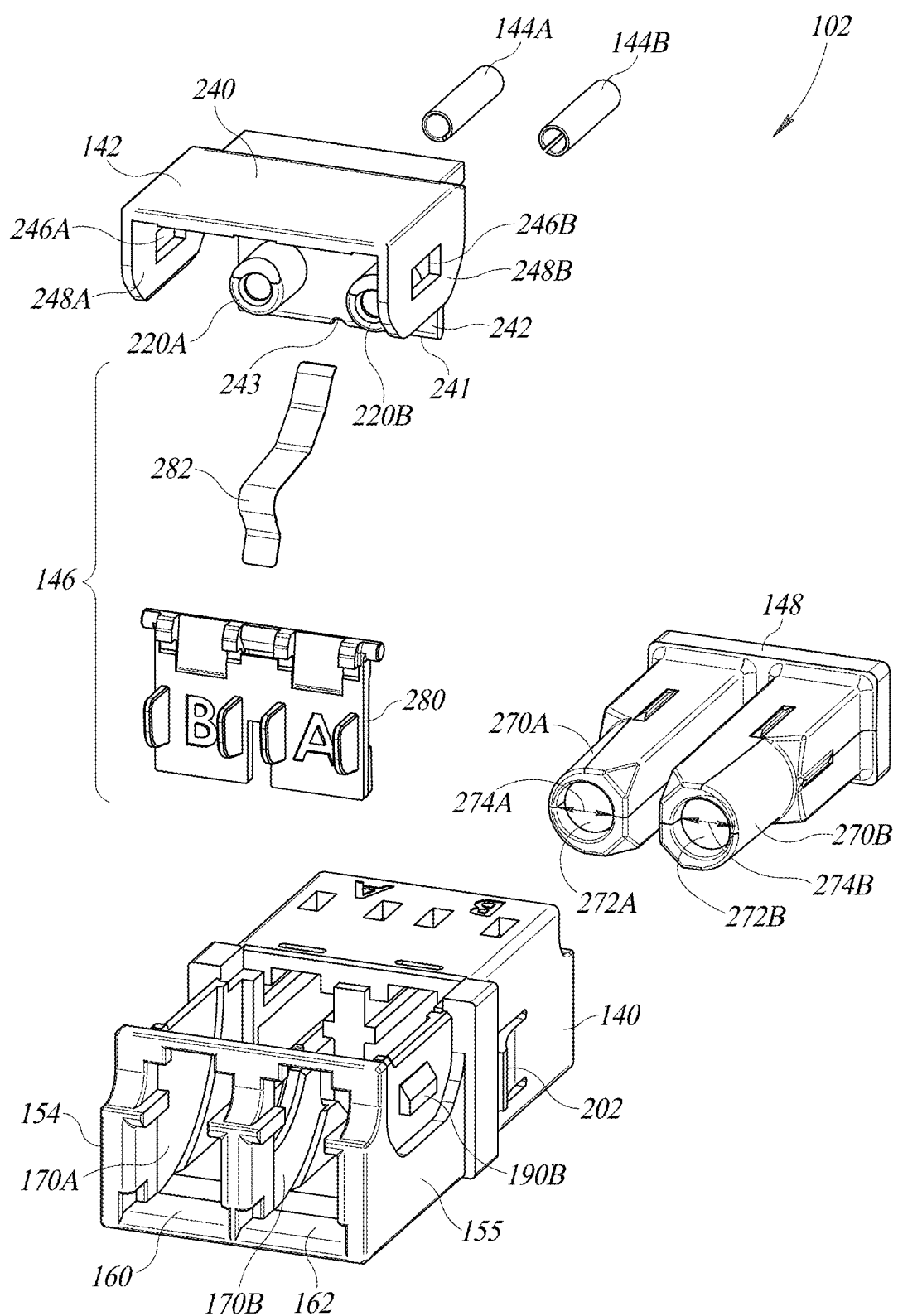
FIG. 4 is an exploded view of the duplex fiber optic adapter.
Figure 13:
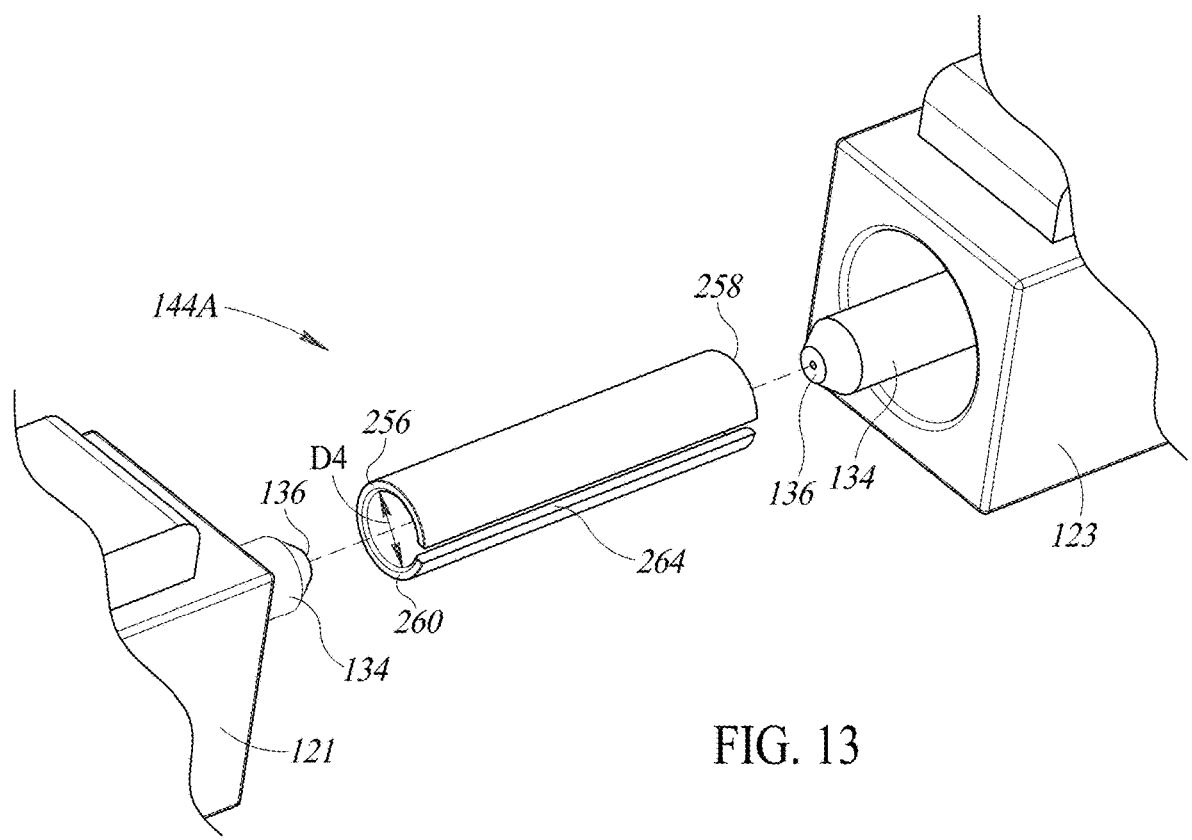
FIG. 13 is a side perspective view of a floating alignment sleeve of the duplex fiber optic adapter illustrated with a pair of ferrules being inserted therein.

Referring to FIG. 4, the duplex fiber optic adapter 102 includes a main body or housing 140, a cover 142, a pair of floating alignment sleeves 144A and 144B, and a shutter assembly 146. Optionally, the duplex fiber optic adapter 102 may include a dust cap 148 to prevent contaminants (e.g. dust) from entering the duplex fiber optic adapter 102, which must be removed before the fiber optic connectors 123 (see FIGS. 1 and 13) and 124 (see FIG. 1) of the second duplexed fiber optic connector C2 (see FIG. 1) are connected to the duplex fiber optic adapter 102. FIG. 4 depicts the dust cap 148 in a duplex form but it can also be configured in a simplex, or single, form as well as other multiples of conjoined dust caps.

Main Housing

Figure 7:
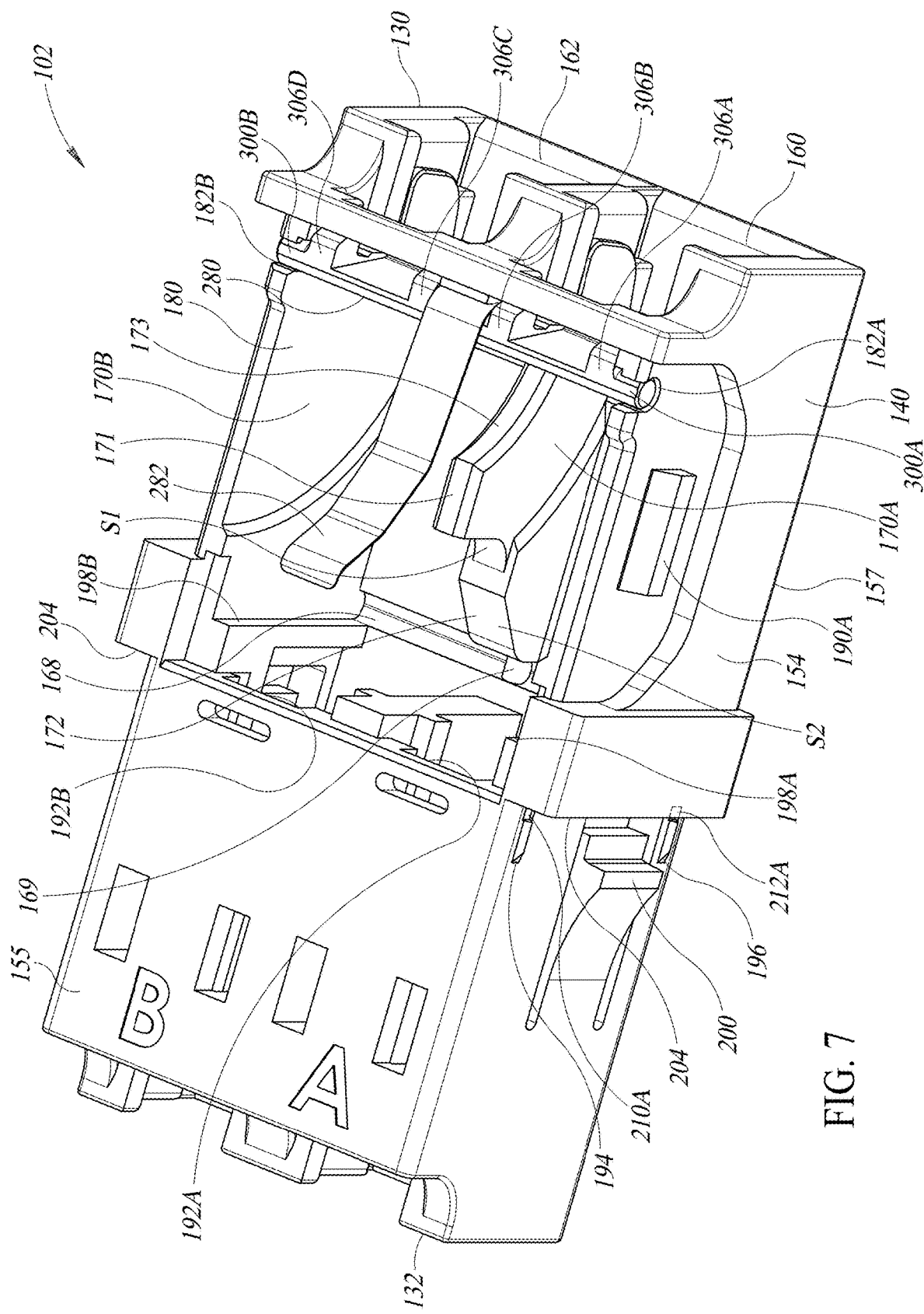
FIG. 7 is a top perspective view of the duplex fiber optic adapter omitting its cover and having its shutter door in the closed position.
Figure 8:
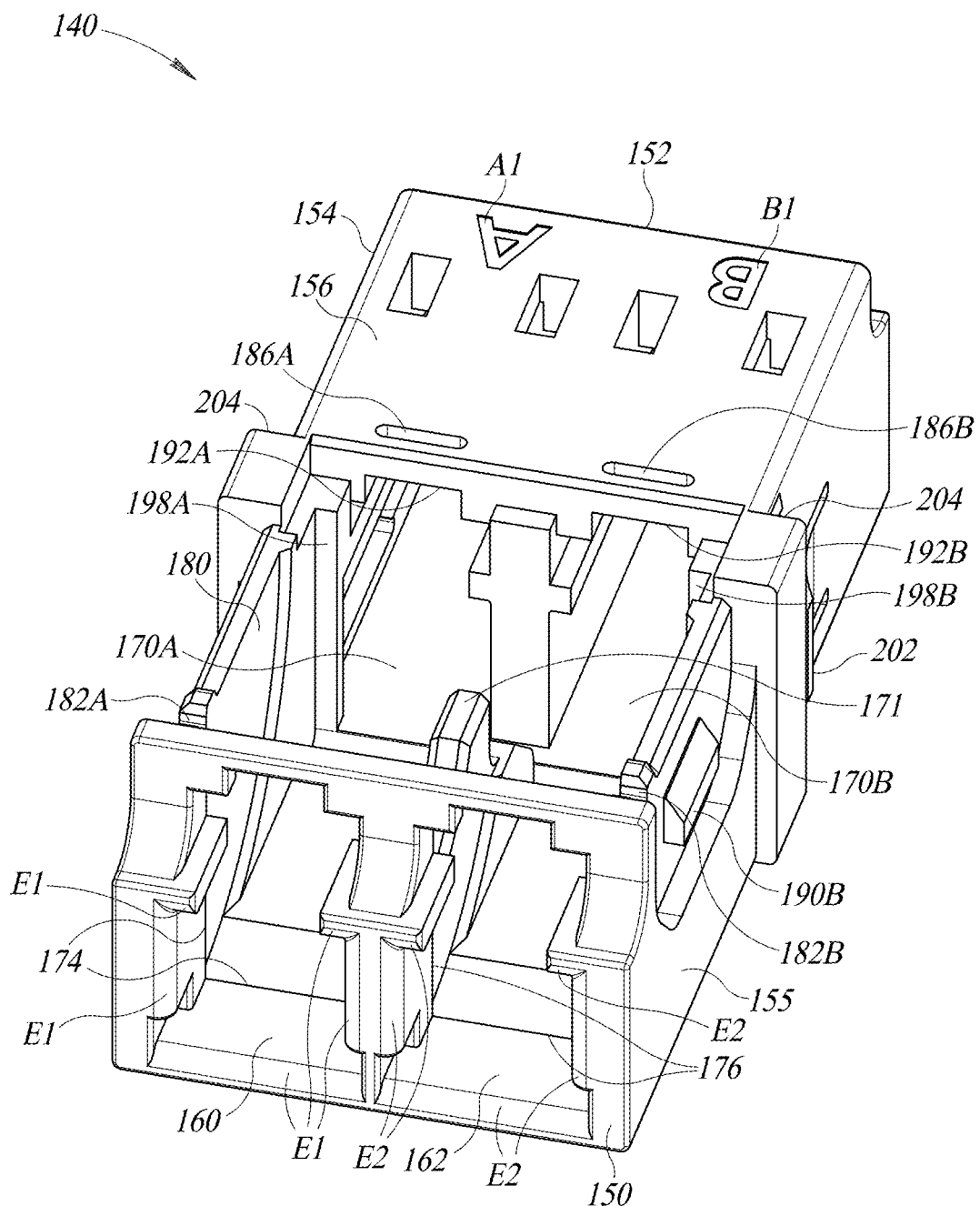
FIG. 8 is a front perspective view of a main housing of the duplex fiber optic adapter illustrated from above the main housing.
Figure 9:
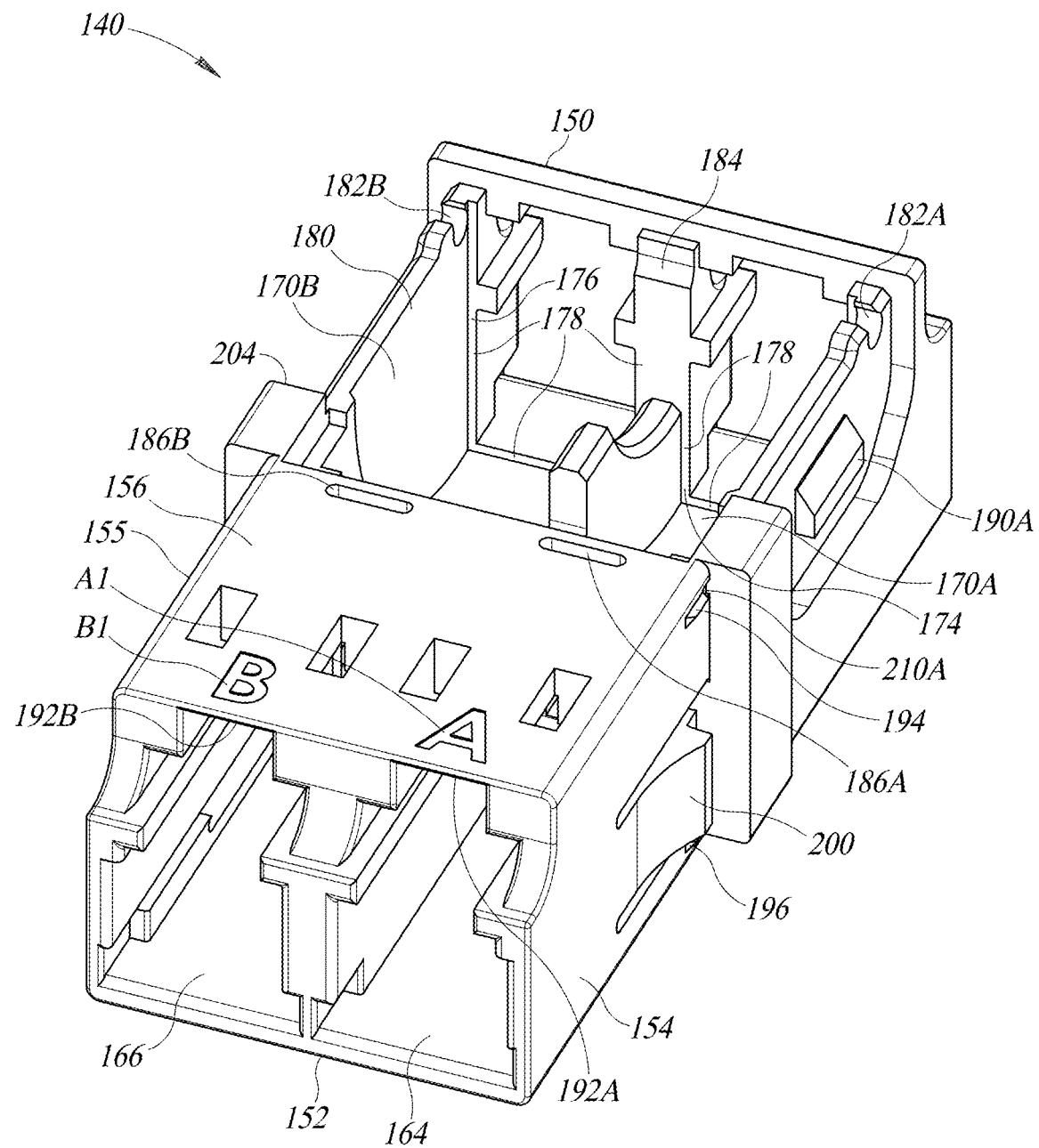
FIG. 9 is a rear perspective view of the main housing of the duplex fiber optic adapter illustrated from above the main housing.
Figure 10:
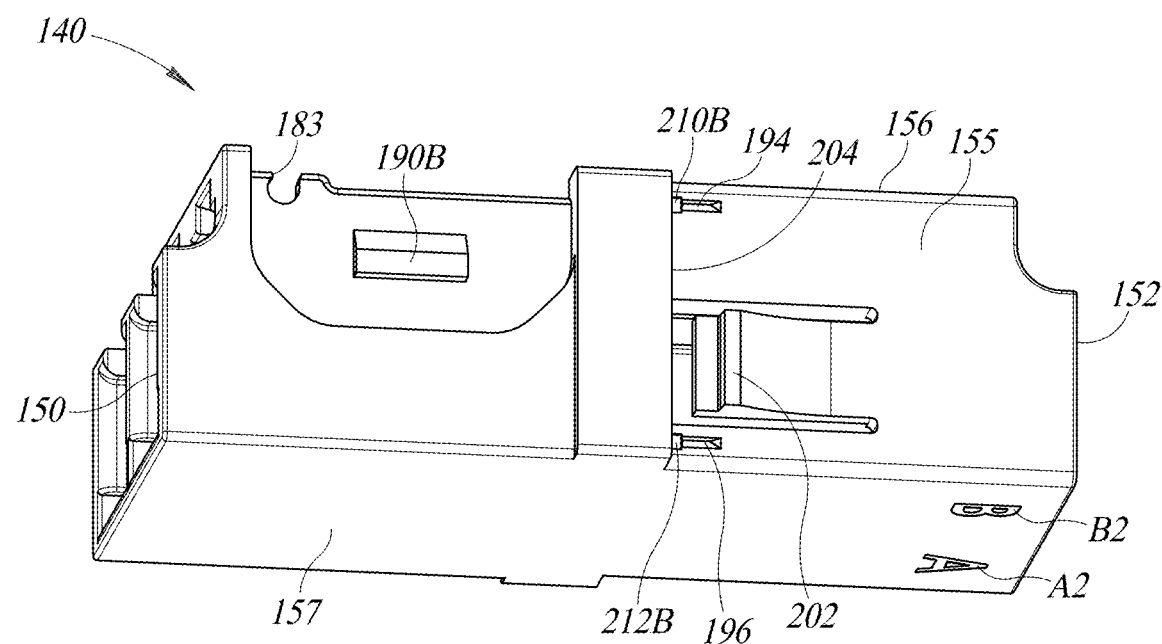
FIG. 10 is a side perspective view of the main housing of the duplex fiber optic adapter illustrated from below the main housing.

Referring to FIGS. 8-10, the main housing 140 of the duplex fiber optic adapter 102 (see FIGS. 1, 3, and 5-7) may have a generally rectangular outer shape. The main housing 140 includes a front shutter side 150 along the forward facing shutter end 130 of the duplex fiber optic adapter 102 (see FIGS. 1, 3, and 5-7) and a non-shuttered rear side 152 along the backward facing non-shuttered end 132 (see FIGS. 1, 3, and 5-7). Referring to FIG. 8, the main housing 140 has a first side 154 opposite a second side 155 and a top side 156 opposite a bottom side 157 (see FIGS. 2, 3, 7, and 10).

Figure 2:
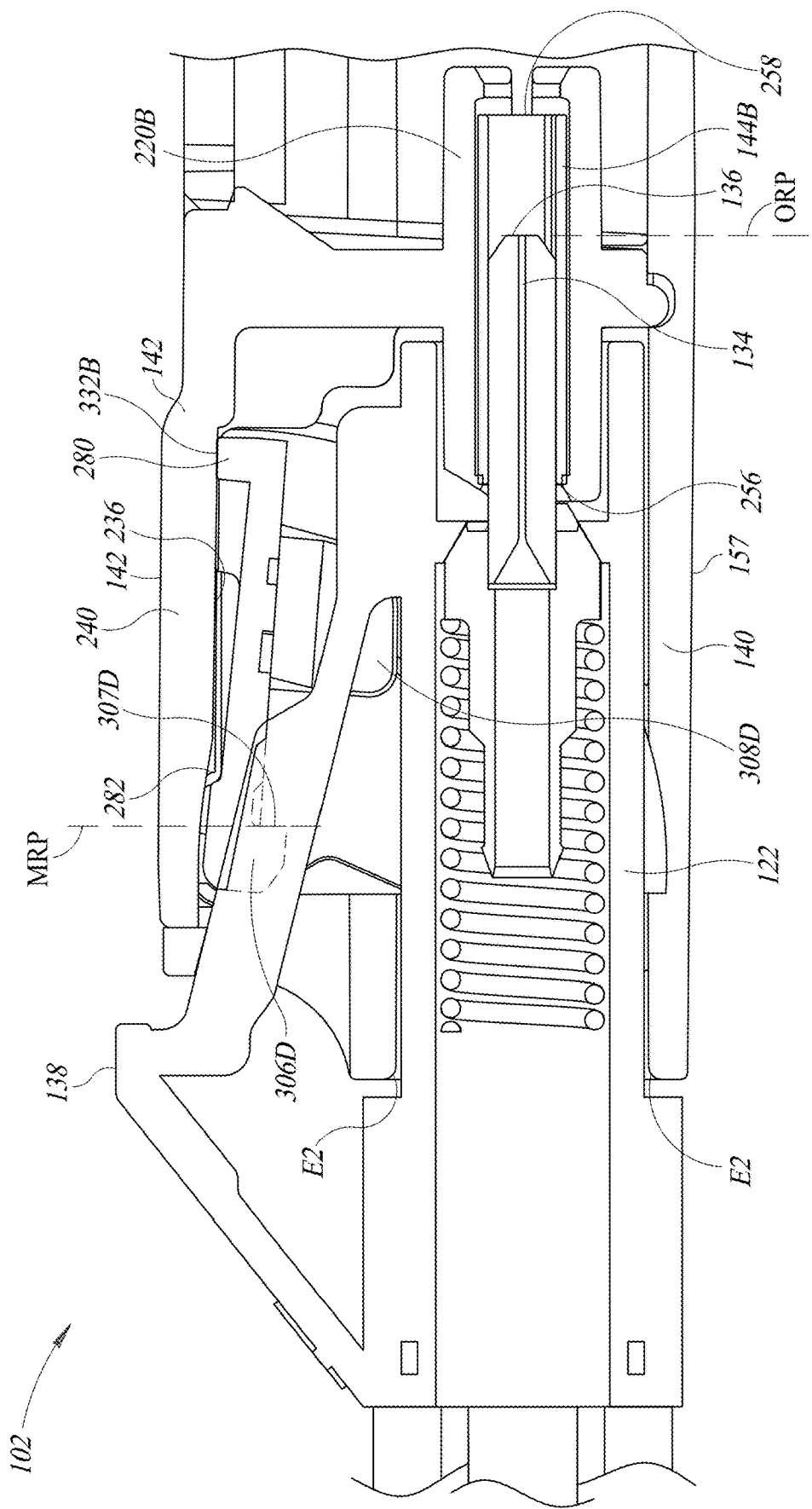
FIG. 2 is a longitudinal cross-sectional view of the duplex fiber optic adapter and a first of the duplexed connectors.

The front shutter side 150 includes front openings or optical ports 160 and 162 configured to receive the first and second fiber optic connectors 121 (see FIGS. 1 and 13) and 122 (see FIGS. 1 and 2). The optical ports 160 and 162 may be radiused, chamfered, or otherwise relieved along their intersections E1 and E2, respectively, with the front shutter side 150 to facilitate easier insertion (e.g., in a crowded patching field) of the first and second fiber optic connectors 121 (see FIGS. 1 and 13) and 122 (see FIGS. 1 and 2) when compared with inserting the first and second fiber optic connectors 121 and 122 into optical ports having un-relieved or right angled intersections. In other words, at their entries, the optical ports 160 and 162 may be radiused, chamfered, or otherwise relieved to ease insertion therein of the first and second fiber optic connectors 121 and 122, respectively.

Referring to FIG. 9, the non-shuttered rear side 152 includes rear openings or optical ports 164 and 166 configured to receive the third and fourth fiber optic connectors 123 (see FIGS. 1 and 13) and 124 (see FIG. 1). Near the non-shuttered rear side 152, the top side 156 may include polarity designations A1 and B1 corresponding to the rear optical ports 164 and 166, respectively. Referring to FIG. 10, near the non-shuttered rear side 152, the bottom side 157 may include polarity designations A2 and B2 corresponding to the rear optical ports 164 and 166 (see FIGS. 5, 6, and 9), respectively.

Figure 5:
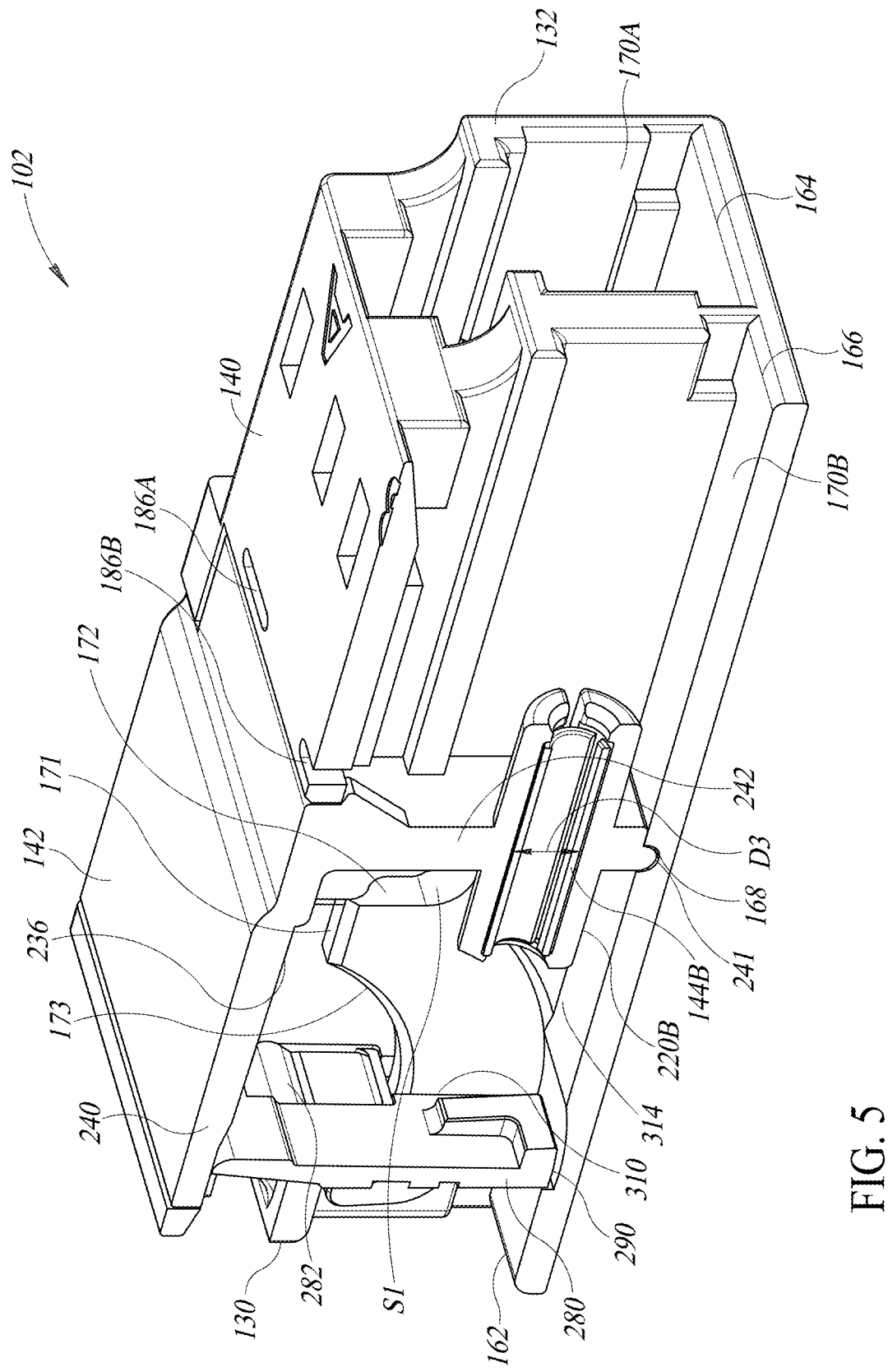
FIG. 5 is a longitudinal cross-sectional view of the duplex fiber optic adapter with its shutter door in a closed position.
Figure 6:
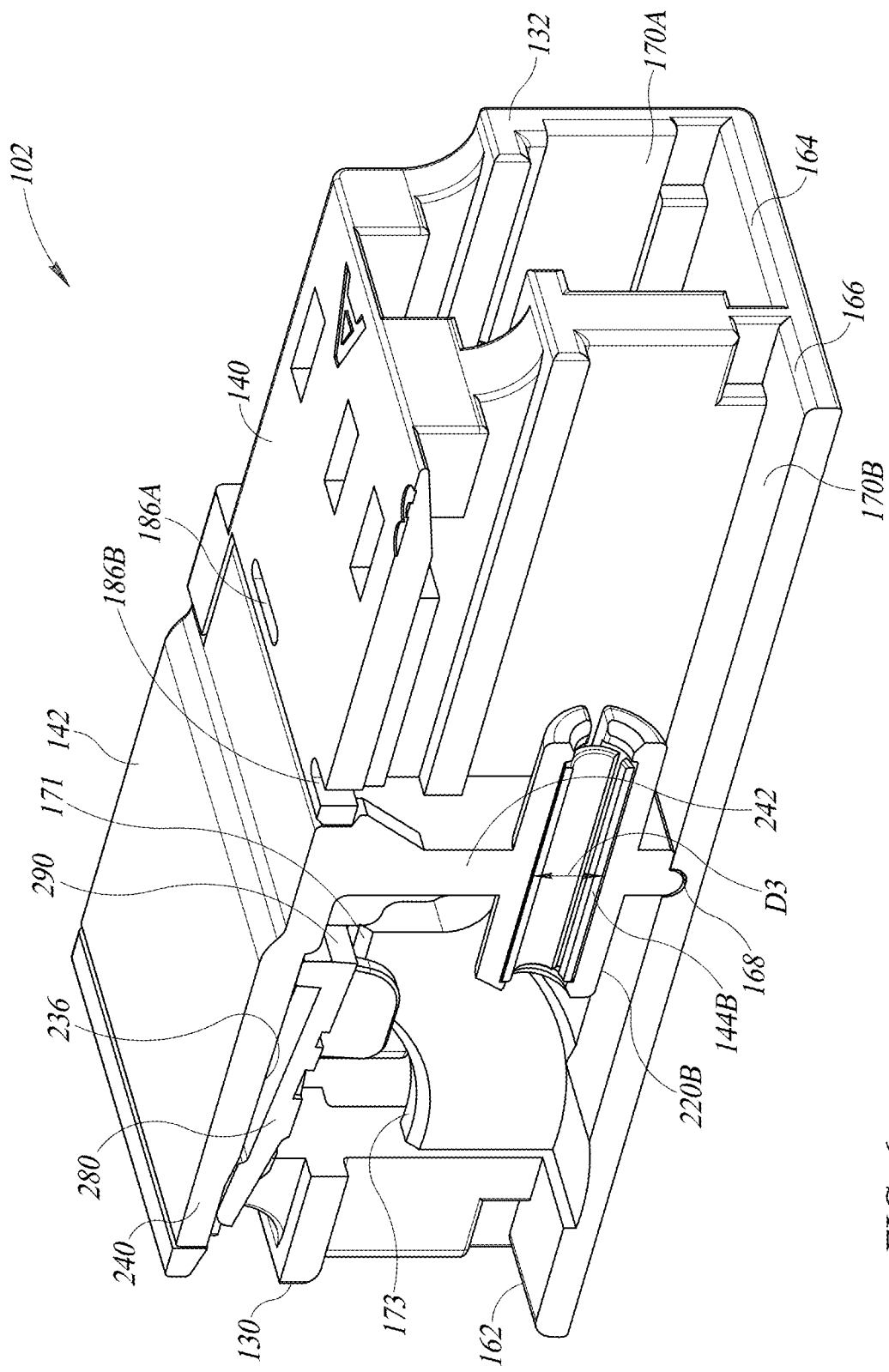
FIG. 6 is a longitudinal cross-sectional view of the duplex fiber optic adapter with its shutter door in an open position.

Referring to FIGS. 5-7, inside the duplex fiber optic adapter 102, an upwardly opening groove 168 is formed in the bottom side 157. An upwardly extending projection 169 is formed, midway along groove 168, and bifurcates the groove 168 at the mid-point along its length.

Referring to FIG. 8, a first through-channel 170A extends from the front optical port 160 to the rear optical port 164 (see FIGS. 5, 6, and 9) and provides a pathway for a first optical signal to be transferred from the fiber optic cable 111 to the fiber optic cable 113 (see FIG. 1). A second through-channel 170B extends from the front optical port 162 to the rear optical port 166 (see FIGS. 5, 6, and 9) and provides a pathway for a second optical signal to be transferred from the fiber optic cable 112 to the fiber optic cable 114 (see FIG. 1). Referring to FIG. 7, the first and second through-channels 170A and 170B are separated by a partition 171 with a contoured rearward facing guide surface 172. The guide surface 172 tapers downwardly toward the groove 168. The guide surface 172 has an upper portion S1 and a lower portion S2. The partition 171 has a curved forward facing surface 173.

Referring to FIG. 8, inside the front optical port 160, the first through-channel 170A includes a first doorjamb 174. Similarly, the second through-channel 170B includes a second doorjamb 176 positioned inside the front optical port 162. Referring to FIG. 9, each of the doorjambs 174 and 176 has an inwardly facing contacting surface 178.

An aperture 180 is formed in the top side 156. The aperture 180 is in communication with the first and second through-channels 170A and 170B. Seats or sockets 182A and 182B are formed in upper edges of the first and second sides 154 and 155, respectively, near the front shutter side 150. Each of the sockets 182A and 182B has a forward overhang portion 183 (see FIG. 10). An inwardly facing curved surface 184 (see FIG. 9) is formed in the front shutter side 150 and is positioned between the first and second through-channels 170A and 170B. Windows 186A and 186B are formed in the top side 156 near the aperture 180.

Tabs 190A and 190B (see FIGS. 3, 4, 8, 10, and 19) extend outwardly from the first and second sides 154 and 155, respectively. The top side 156 includes inwardly opening notches 192A and 192B that extend from the front shutter side 150 to the non-shuttered rear side 152. The notches 192A and 192B are positioned above the first and second through-channels 170A and 170B, respectively.

Figure 3:
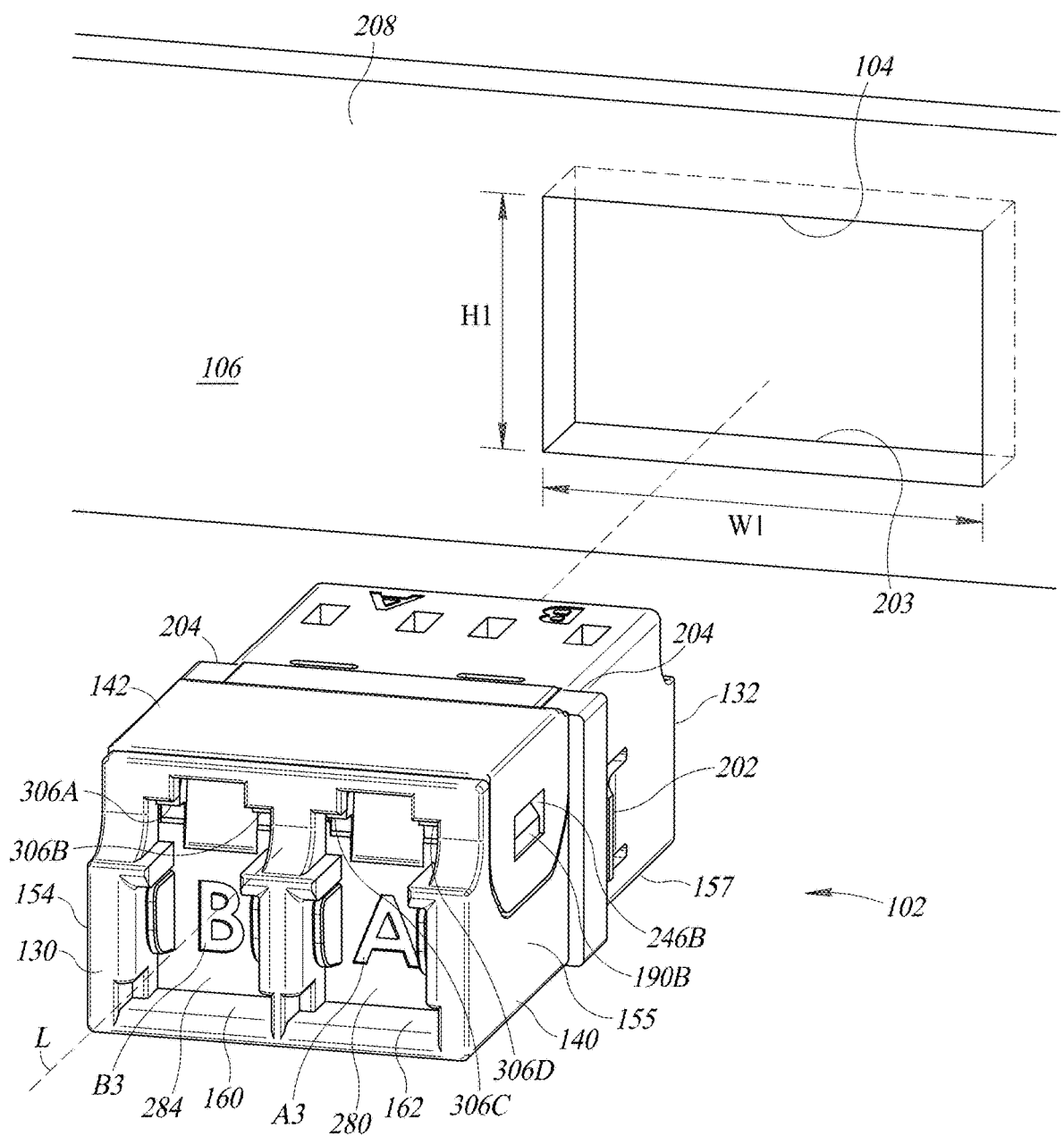
FIG. 3 is a front perspective view of the duplex fiber optic adapter being inserted into an opening of a panel or plate.

Referring to FIG. 3, as mentioned above, the main housing 140 of the duplex fiber optic adapter 102 may be configured to be received inside the opening 104 formed in the plate 106. In such embodiments, the first and second sides 154 and 155 may each include an upper centering rib 194 (see FIGS. 7, 9, 10, 19, and 20) and a lower centering rib 196 (see FIGS. 7, 9, 10, 19, and 20). Referring to FIG. 10, the upper centering rib 194 is positioned near the top side 156 and the lower centering rib 196 is positioned near the bottom side 157.

Referring to FIG. 7, the main housing 140 of the duplex fiber optic adapter 102 includes forward facing stop walls 198A and 198B extending inwardly from the first and second sides 154 and 155, respectively. The stop walls 198A and 198B help guide the cover 142 (see FIGS. 2-6, 11, and 12) into place and help align the cover 142 with the groove 168.

Flexible snap latch arms 200 and 202 (see FIGS. 3, 4, 8, 10, and 19) are formed in the first and second sides 154 and 155, respectively. Referring to FIG. 3, the snap latch arms 200 (see FIGS. 7, 9, 18, and 20) and 202 are configured to removably couple the duplex fiber optic adapter 102 to the plate 106. In other words, the snap latch arms 200 and 202 are configured to latch onto the plate 106. For example, the snap latch arms 200 and 202 may bear against an inwardly facing surface 203 of the plate 106 along opposite sides of the opening 104. The first and second sides 154 and 155 each include a stop 204 positioned to bear against a forwardly facing surface 208 of the plate 106 alongside the opposite sides of the opening 104. Thus, the stops 204 of the first and second sides 154 and 155 limit how far the main housing 140 can be inserted into the opening 104. Referring to FIG. 7, on the first side 154, recesses 210A and 212A may be defined between the stop 204 and the upper and lower centering ribs 194 and 196, respectively. Similarly, referring to FIG. 10, recesses 210B and 212B may be defined between the stop 204 and the upper and lower centering ribs 194 and 196, respectively, on the second side 155. The recesses 210A, 210B, 212A, and 212B provide a storage location for debris (e.g., removed plastic) inside the opening 104 (see FIG. 3).

Referring to FIG. 3, the opening 104 may be generally rectangular in shape. Currently, industry standards define a height H1 and a width W1 for the opening 104, which is configured to receive a duplex fiber optic adapter. According to these industry standards, the width W1 must be within a broad range of predefined widths. Unfortunately, it can be challenging for the snap latch arms 200 and 202 to accommodate such a broad range of predefined widths. For example, if the width W1 is at the upper end of the range of predefined widths, the opening 104 may be large enough such that the duplex fiber optic adapter 102 rattles within the opening 104 and/or rotates within the opening 104, which may cause one of the snap latch arms 200 and 202 to pull free from the plate 106. To avoid this, the upper and lower centering ribs 194 and 196 (see 7, 9, 10, 19, and 20) of each of the first and second sides 154 and 155 are configured to be positioned inside the opening 104 and may be compressed within the opening 104. Thus, the upper and lower centering ribs 194 and 196 on each of the first and second sides 154 and 155 ensure the main housing 140 fits snugly within the opening 104 and prevent rattling and/or rotation therein.

The main housing 140 of the duplex fiber optic adapter 102 may have a one-piece design configured to provide precise indexing, positioning, referencing guides, and/or mating constraints for mating with other components and enabling the final assembly to meet demanding industry dimensional standards. Such a one-piece construction may make the duplex fiber optic adapter 102 much stronger than prior are fiber optic adapters constructed using a multi-part main housing. For example, the outer housings of many prior art fiber optic adapters are assembled using an ultrasonic welding process or an adhesive. By way of a non-limiting example, the main housing 140 may constructed (e.g., molded) from plastic.

Cover

Referring to FIG. 4, the cover 142 includes a pair of cylinders 220A and 220B oriented to extend along the longitudinal axis "L" (see FIG. 3). The cylinders 220A and 220B are configured to be positioned inside the first and second through-channels 170A and 170B, respectively, of the main housing 140. The cylinder 220A is aligned with the front optical port 160 and the rear optical port 164 (see FIGS. 5, 6, and 9). The cylinder 220B is aligned with the front optical port 162 and the rear optical port 166.

Figure 11:
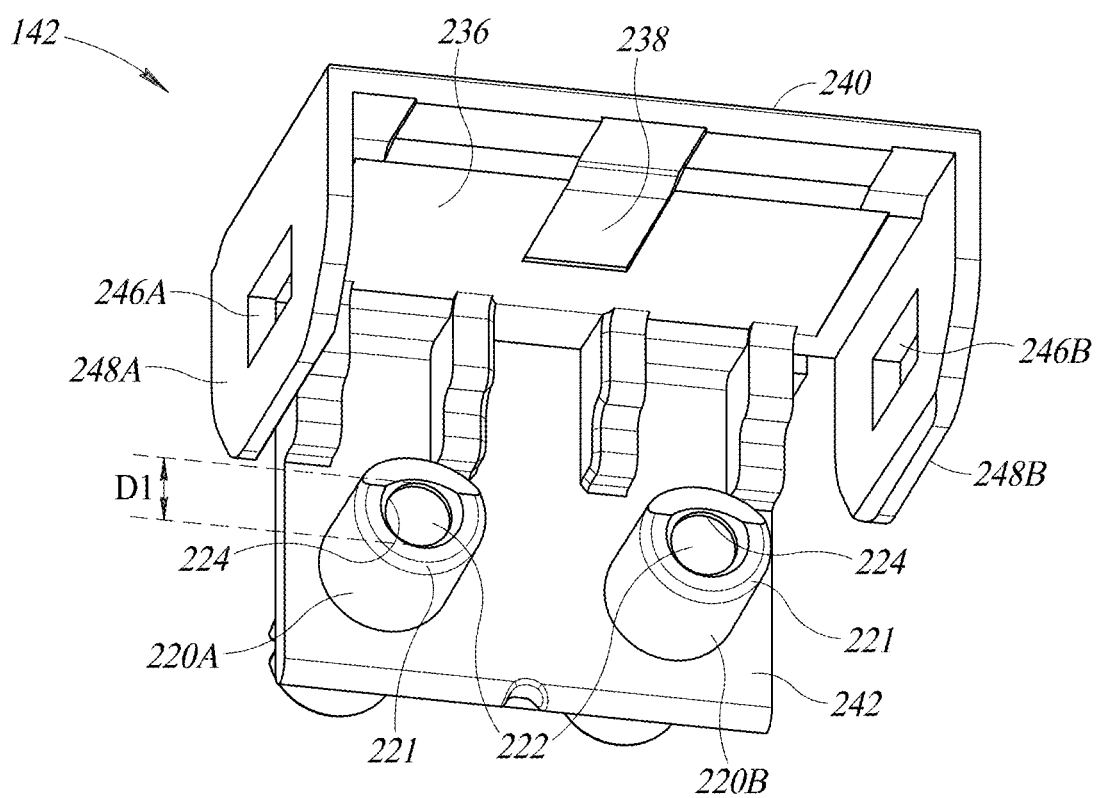
FIG. 11 is a front perspective view of the cover of the duplex fiber optic adapter illustrated from below the cover.

Referring to FIG. 11, each of the cylinders 220A and 220B is generally tube shaped. Each of the cylinders 220A and 220B has a sidewall 221 defining an open-ended through channel or bore 222. The bore 222 extends from a front opening 224 to a rear opening 226 (see FIG. 12). The bore 222 has a first diameter D1 at or near the front opening 224. The bore 222 has a second diameter D2 at or near the rear opening 226. Referring to FIGS. 5 and 6, the bore 222 has a third diameter D3 between the first and second diameters D1 and D2. The third diameter D3 is larger than both the first and second diameters D1 and D2.

Referring to FIGS. 5 and 6, the cover 142 includes a closure portion 240 configured to close the aperture 180 (see FIGS. 7-9) of the main housing 140. The closure portion 240 has an inwardly facing side or underside 236 that optionally includes a recess 238 (see FIG. 11). The underside 236 is positioned adjacent to and closes the upwardly opening sockets 182A and 182B.

Figure 12:
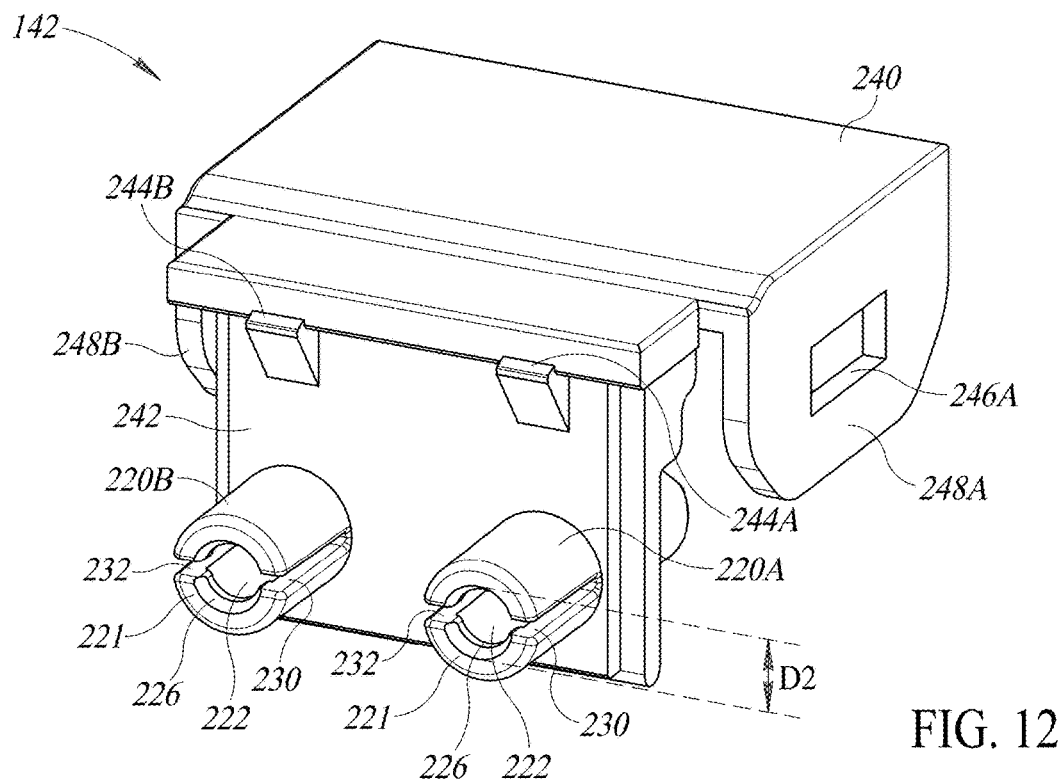
FIG. 12 is a rear perspective view of the cover of the duplex fiber optic adapter illustrated from above the cover.

The cover 142 includes a support portion 242 that extends downwardly from the closure portion 240. The cylinders 220A and 220B are mounted on and extend through the support portion 242. Referring to FIG. 12, the sidewall 221 of each of the cylinders 220A and 220B includes slots 230 and 232 that extend longitudinally from the rear opening 226 partway toward the front opening 224. In the embodiment illustrated, the slots 230 and 232 each terminate at or near the support portion 242.

Referring to FIG. 4, when the cover 142 is attached to the main housing 140, the support portion 242 is inserted through the aperture 180 (see FIGS. 7-9) to position the cylinders 220A and 220B inside the first and second through-channels 170A and 170B, respectively. The support portion 242 has a free lower edge 241 configured to be received inside the groove 168 (see FIGS. 5-7) of the main housing 140. The free lower edge 241 includes a centrally located notch 243 configured to receive the projection 169 formed in the groove 168. Together, the projection 169 and the notch 243 help ensure proper positioning of the cover 142 with respect to the main housing 140. This positioning places the cylinders 220A and 220B inside the first and second through-channels 170A and 170B, respectively.

Referring to FIG. 12, the cover 142 includes rearward extending locking projections 244A and 244B and side locking apertures 246A and 246B configured to permanently affix the cover 142 to the main housing 140 (see FIGS. 2-10). In the embodiment illustrated, the locking projections 244A and 244B are arranged on the support portion 242 of the cover 142. The locking projections 244A and 244B may each be characterized as being a snap element. The locking projections 244A and 244B are positioned to be received inside the notches 192A and 192B (see FIG. 8), respectively, adjacent the aperture 180. The locking projections 244A and 244B may help prevent the cover 142 from flexing with respect to the main housing 140 (see, e.g., FIG. 4).

Referring to FIG. 5, to assemble the cover 142 and the main housing 140, the support portion 242 is first positioned against the upper portion S1 of the guide surface 172 and slid downwardly. As the support portion 242 slides downwardly, the upper portion S1 moves the support portion 242 rearwardly. The windows 186A and 186B are positioned behind the locking projections 244A and 244B (see FIG. 12), respectively. As the support portion 242 moves rearwardly, the windows 186A and 186B allow the main housing 140 to flex rearwardly temporarily to accept the locking projections 244A and 244B. Referring to FIG. 7, in the embodiment illustrated, the lower portion S2 is generally planar and slopes toward the groove 168. Thus, referring to FIG. 5, as the support portion 242 continues to slide along the guide surface 172, the lower portion S2 (see FIG. 7) guides the free lower edge 241 toward the groove 168 and the support portion 242 rearwardly toward the stop walls 198A and 198B (see FIGS. 7 and 8). A seal may be formed between the stop walls 198A and 198B and the edges of the support portion 242.

The locking projections 244A and 244B and the locking apertures 246A and 246B (see FIG. 12) are oriented to allow the cover 142 to be pressed directly into the main housing 140 along a downward travel path perpendicular to the longitudinal axis "L" of the duplex fiber optic adapter 102 (see FIG. 3) with the support portion 242 oriented to be received within the groove 168 by the guide surface 172 and the stop walls 198A and 198B (see FIGS. 5-8). The guide surface 172 and the stop walls 198A and 198B also position the locking projections 244A and 244B inside the notches 192A and 192B, respectively.

Referring to FIG. 4, sidewalls 248A and 248B extend downwardly from the closure portion 240 along the outside of the first and second sides 154 and 155, respectively, of the main housing 140. The locking apertures 246A and 246B are formed in the sidewalls 248A and 248B, respectively. The locking apertures 246A and 246B are configured to receive the tabs 190A (see FIGS. 7, 9, 18, and 20) and 190B, respectively, of the main housing 140. The locking apertures 246A and 246B are configured to resist upwardly directed lateral forces applied by the first and second fiber optic connectors 121 (see FIGS. 1 and 13) and 122 (see FIGS. 1 and 2) to the cover 142. Such lateral forces include pull forces that could disengage the first and second fiber optic connectors 121 and 122 from the duplex fiber optic adapter 102. Thus, the duplex fiber optic adapter 102 may be configured to resist greater pull forces than prior art duplex fiber optic adapters.

The cover 142 may be constructed (e.g., molded) as a single unitary piece. However, this is not a requirement. By way of a non-limiting example, the cover 142 may be constructed (e.g., molded) from plastic.

Floating Alignment Sleeve

Referring to FIG. 4, the floating alignment sleeves 144A and 144B are substantially identical to one another. For ease of illustration, only the floating alignment sleeve 144A has been illustrated in FIG. 13 and will be described in detail. The floating alignment sleeve 144A may be generally tube shaped having a first end 256 opposite a second end 258. An open-ended through-channel 260 defined by a sidewall 262 extends from the first end 256 to the second end 258. Thus, the through-channel 260 has an opening positioned at each of the first and second ends 256 and 258. The through-channel 260 has an inner diameter D4. In the embodiment illustrated, the sidewall 262 is discontinuous with a longitudinally extending slit or opening 264 formed therein. At the first end 256 of the floating alignment sleeve 144A, the opening 264 allows the inner diameter D4 of the through-channel 260 to expand to receive the ferrule 134 of the first fiber optic connector 121. At the second end 258 of the floating alignment sleeve 144A, the opening 264 allows the inner diameter D4 to expand to receive the ferrule 134 of the third fiber optic connector 123. Inside the through-channel 260 of the floating alignment sleeve 144A, the end faces 136 of the first and third fiber optic connectors 121 and 123 contact one another and transfer the first optical signal therebetween.

Referring to FIG. 2, at the first end 256 of the floating alignment sleeve 144B, the opening 264 (see FIG. 13) allows the inner diameter D4 of the through-channel 260 to expand to receive the ferrule 134 of the second fiber optic connector 122. At the second end 258 of the floating alignment sleeve 144A, the opening 264 allows the inner diameter D4 to expand to receive the ferrule 134 of the fourth fiber optic connector 124 (see FIG. 1). Inside the floating alignment sleeve 144B, the end faces 136 of the second and fourth fiber optic connectors 122 and 124 contact one another and transfer the second optical signal therebetween.

Referring to FIG. 4, the floating alignment sleeve 144A has a length that is shorter than a length of the cylinder 220A and the floating alignment sleeve 144B has a length that is shorter than a length of the cylinder 220B. Thus, the floating alignment sleeves 144A and 144B are configured to be fully received inside the cylinders 220A and 220B, respectively. Referring to FIGS. 11 and 12, the first and second diameters D1 and D2 of the bore 222 of the cylinder 220A are configured to retain the floating alignment sleeve 144A (see FIGS. 4 and 13) inside the bore 222 of the cylinder 220A. Similarly, the first and second diameters D1 and D2 of the bore 222 of the cylinder 220B are configured to retain the floating alignment sleeve 144B (see FIGS. 2 and 4-6) inside the bore 222 of the cylinder 220B. The larger third diameter D3 (see FIGS. 5 and 6) of the bore 222 of the cylinder 220A is configured to allow the floating alignment sleeve 144A to float therein as needed to support industry standards regarding a true position of the bore 222 of the cylinder 220A. Similarly, the larger third diameter D3 of the bore 222 of the cylinder 220B is configured to allow the floating alignment sleeve 144B to float therein as needed to support industry standards regarding a true position of the bore 222 of the cylinder 220B.

Referring to FIG. 12, the sidewalls 221 of the cylinders 220A and 220B are configured to flex outwardly temporarily enlarging (or opening) the slots 230 and 232 and expanding the rear openings 226 when the floating alignment sleeves 144A and 144B (see, e.g., FIG. 4) are inserted the rear openings 226 of the cylinders 220A and 220B, respectively. After the floating alignment sleeves 144A and 144B have been inserted into the rear openings 226, the slots 230 and 232 return to their original (closed) shapes. In this manner, the cylinders 220A and 220B retain the floating alignment sleeves 144A and 144B, respectively, entirely within the bores 222 (see FIGS. 2 and 5) of the cylinders 220A and 220B. In other words, the cover 142 may be characterized as a holder of the floating alignment sleeves 144A and 144B. Together, the cover 142 and the floating alignment sleeves 144A and 144B may form a subassembly that may be assembled in batches before final assembly.

Referring to FIG. 4, the floating alignment sleeves 144A and 144B may each be constructed from a ceramic material. By way of non-limiting examples, the floating alignment sleeves 144A and 144B may each be implemented as a resilient (split) ceramic alignment sleeve, a ridged (not split) ceramic alignment sleeve, and the like.

Referring to FIG. 4, the dust cap 148 illustrated has a pair of side-by-side projecting portions 270A and 270B configured to be received inside the rear optical ports 164 and 166 (see FIGS. 5, 6, and 9), respectively. The side-by-side projecting portions 270A and 270B have channels 272A and 272B, respectively, formed therein. The channels 272A and 272B have inside diameters 274A and 274B, respectively, configured to receive the cylinders 220A and 220B, respectively, and radially seal them. The side-by-side projecting portions 270A and 270B are configured to abut the support portion 242. Thus, the rear openings 226 (see FIG. 12) of the cylinders 220A and 220B with the floating alignment sleeves 144A and 144B, respectively, therein may be completely received inside and sealed by the side-by-side projecting portions 270A and 270B. In this manner, the side-by-side projecting portions 270A and 270B help prevent dust and debris from entering the cylinders 220A and 220B and/or the floating alignment sleeves 144A and 144B.

Shutter Assembly

Figure 14:
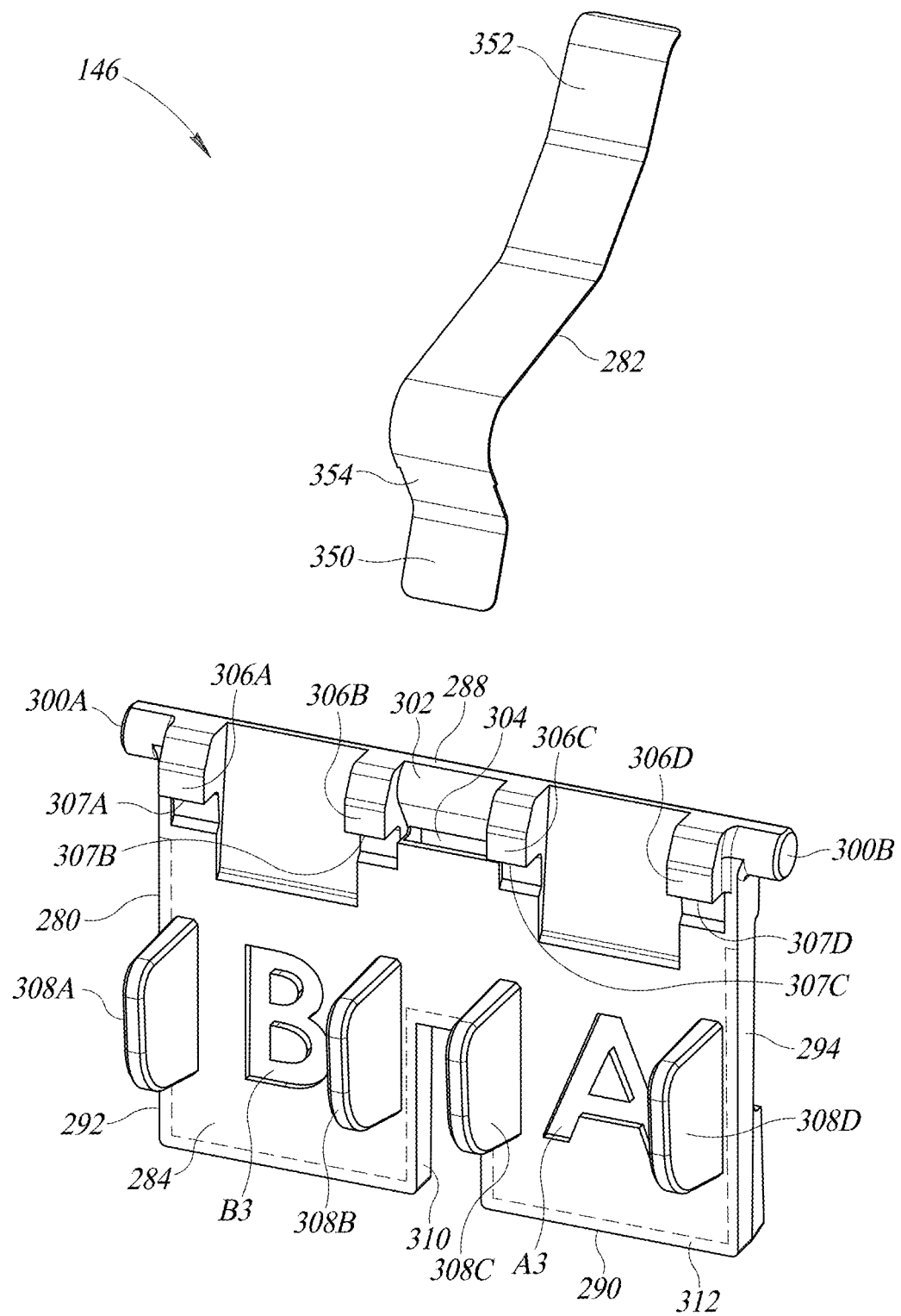
FIG. 14 is an exploded front perspective view of a shutter assembly of the duplex fiber optic adapter.
Figure 15:
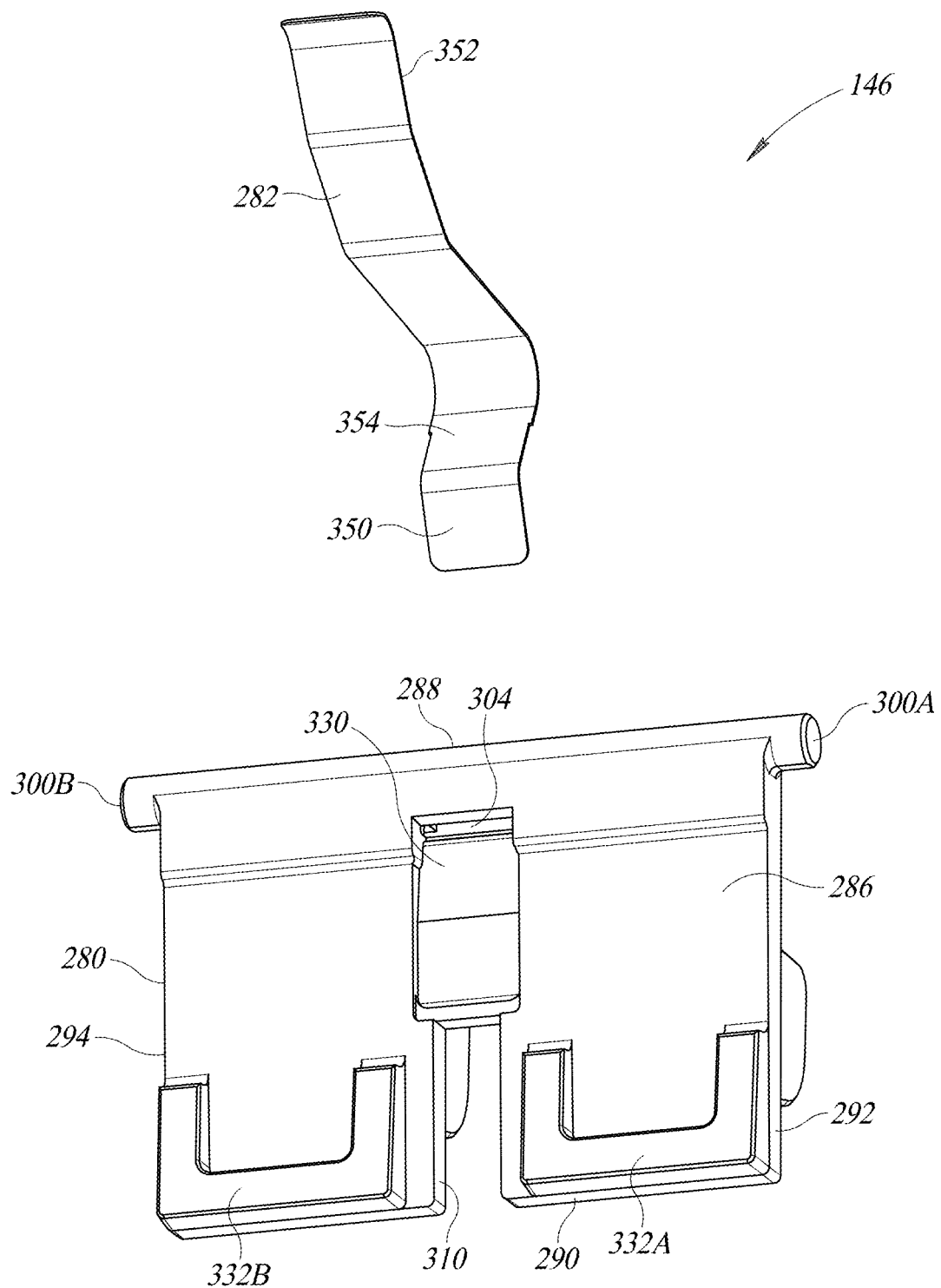
FIG. 15 is an exploded rear perspective view of the shutter assembly of the duplex fiber optic adapter.
Figure 16:
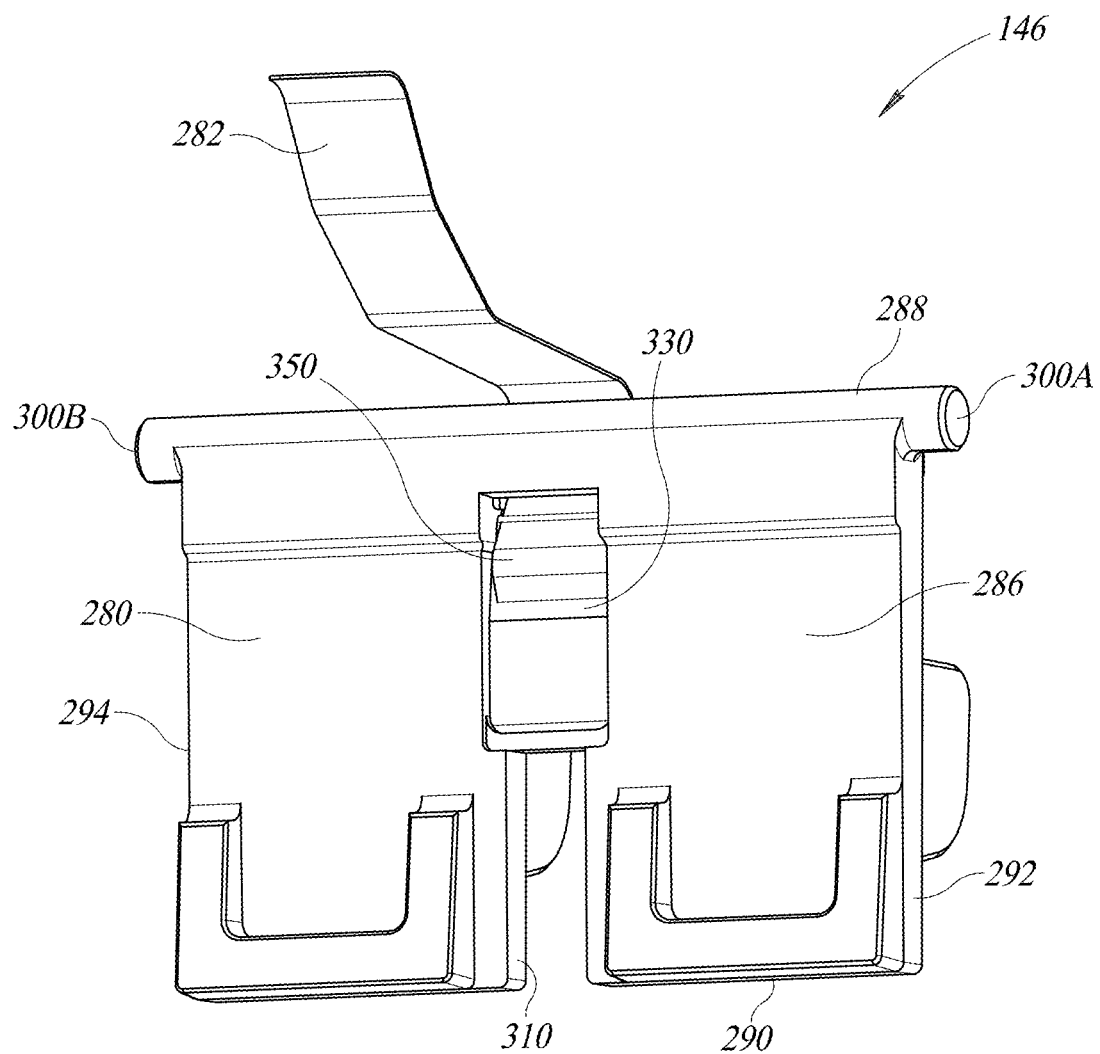
FIG. 16 is a rear perspective view of the shutter assembly of the duplex fiber optic adapter.

Referring to FIGS. 14-16, the shutter assembly 146 includes a shutter door 280 that is biased by a spring or biasing member 282. The shutter door 280 has an outwardly facing surface 284 opposite an inwardly facing surface 286. The shutter door 280 has an upper portion 288 opposite a lower portion 290 and a first side 292 opposite a second side 294.

Along the upper portion 288, the shutter door 280 includes a first pivot pin 300A that extends laterally outwardly from the first side 292 and a second pivot pin 300B that extends laterally outwardly from the second side 294. The first and second pivot pins 300A and 300B are configured to be snapped into the sockets 182A and 182B (see FIGS. 7-9), respectively, and to be rotatable therein.

Referring to FIG. 14, in the upper portion 288, the outwardly facing surface 284 includes an outwardly and forwardly facing curved surface 302 configured to be positioned alongside the inwardly facing curved surface 184 (see FIG. 9). Below the curved surface 302, the shutter door 280 has a through-hole 304 configured to receive the biasing member 282. A plurality of engagement projections 308A-308D extend outwardly from the outwardly facing surface 284 between the upper and lower portions 288 and 290 of the shutter door 280. The engagement projections 308A and 308B are configured to engage the first fiber optic connector 121 (see FIGS. 1 and 13) when the first fiber optic connector 121 is inserted into the front optical port 160 (see FIGS. 3, 4, 7, and 8). The engagement projections 308A and 308B are sufficiently spaced apart and sized to avoid contacting the ferrule 134 (see FIGS. 1, 2, and 13) of the first fiber optic connector 121. Additionally, the engagement projections 308A and 308B are configured to prevent the end face 136 (see FIGS. 1, 2, and 13) of the ferrule 134 of the first fiber optic connector 121 from contacting the outwardly facing surface 284 of the shutter door 280. The engagement projections 308A and 308B are configured to rest on the first fiber optic connector 121 when the shutter door 280 is in an open position (see FIGS. 2 and 6). The outwardly extending latch arm 138 (see FIGS. 1 and 2) of the first fiber optic connector 121 may extend between the engagement projections 308A and 308B.

Similarly, the engagement projections 308C and 308D are configured to engage the second fiber optic connector 122 (see FIGS. 1 and 2) when the second fiber optic connector 122 is inserted into the front optical port 162 (see FIGS. 3-8). The engagement projections 308C and 308D are sufficiently spaced apart and sized to avoid contacting the ferrule 134 (see FIGS. 1, 2, and 13) of the second fiber optic connector 122. Additionally, the engagement projections 308C and 308D are configured to prevent the end face 136 (see FIGS. 1, 2, and 13) of the ferrule 134 of the second fiber optic connector 122 from contacting the outwardly facing surface 284 of the shutter door 280. In other words, the outwardly facing surface 284 of the shutter door 280 does not contact the end faces 136 of the ferrules 134 of the first and second fiber optic connectors 121 and 122. Thus, the outwardly facing surface 284 does not transfer contamination or cause damage to the end faces 136. The engagement projections 308C and 308D are configured to rest on the second fiber optic connector 122 when the shutter door 280 is in the open position (see FIGS. 2, 14). The outwardly extending latch arm 138 of the second fiber optic connector 122 may extend between the engagement projections 308C and 308D.

Referring to FIG. 14, a plurality of locking projections 306A-306D extend outwardly from the outwardly facing surface 284 in the upper portion 288 of the shutter door 280. The locking projections 306A and 306B are configured to clip onto the outwardly extending latch arm 138 (see FIGS. 1 and 2) of the first fiber optic connector 121 and the locking projections 306C and 306D are configured to clip onto the outwardly extending latch arm 138 (see FIGS. 1 and 2) of the second fiber optic connector 122. Thus, the locking projections 306A and 306B may be characterized as being a first latch catch and the locking projections 306C and 306D may be characterized as being a second latch catch. The locking projections 306A-306D have downward facing coplanar surfaces 307A-307D, respectively, arranged to define a mechanical reference plane MRP (see FIG. 2).

Referring to FIG. 2, the end faces 136 of the first and second fiber optic connectors 121 and 122 are arranged to be coplanar and define an optical reference plane ORP. Industry standards specify distances between the mechanical reference plane MRP and the optical reference plane ORP. The components of the duplex fiber optic adapter 102 may be configured to satisfy such industry standards.

For example, referring to FIG. 4, precision dimensional control may be established by the main housing 140, which determines the position of the shutter door 280 and the cover 142. Referring to FIG. 7, the sockets 182A and 182B help to keep the shutter door 280 in the correct location so that the locking projections 306A and 306B satisfy industry standards and are positioned to clip onto the outwardly extending latch arm 138 (see FIGS. 1 and 2) of the first fiber optic connector 121 (see FIGS. 1 and 13). Similarly, the locking projections 306C and 306D are positioned to satisfy industry standards and to clip onto the outwardly extending latch arm 138 of the second fiber optic connector 122 (see FIGS. 1 and 2). Referring to FIG. 4, the cylinders 220A and 220B of the cover 142 determine the positions of the ferrules 134 (see FIGS. 1 and 2) of the first and second fiber optic connectors 121 and 122, respectively.

As shown in FIG. 2, the main housing 140 of the duplex fiber optic adapter 102 may be configured to comport with industry standards for the LC connector and adapter that define the dimensional ranges for the MRP and ORP to ensure intermateability.

Referring to FIG. 5, the lower portion 290 of the shutter door 280 includes a cutout or notch 310 configured to receive the partition 171 positioned between the first and second through-channels 170A and 170B. The partition 171 helps prevent the shutter door 280 from sliding laterally within the main housing 140. The curved forward facing surface 173 is positioned within the notch 310 and allows the shutter door 280 to rotate about the pivot pins 300A and 300B (see FIGS. 7 and 14-16).

Referring to FIG. 14, a peripheral portion of the outwardly facing surface 284 may be characterized as being an outwardly facing contacting surface 312. In the embodiment illustrated, the biasing member 282 biases the shutter door 280 toward a closed position (see FIGS. 3, 5, and 7). The outwardly facing contacting surface 312 is configured to contact the inwardly facing contacting surfaces 178 (see FIG. 9) of the doorjambs 174 and 176 (see FIGS. 8 and 9) when the shutter door 280 is in the closed position. In other words, the shutter door 280 blocks both the front optical ports 160 (see FIGS. 3, 4, 7, and 8) and 162 (see FIGS. 3-8) when the shutter door 280 is in the closed position. Thus, the shutter door 280 may be characterized as forming a seal with the doorjambs 174 and 176 that at least partially defines a sealed internal cavity 314 (see FIG. 5). Referring to FIG. 5, this seal helps prevent contamination (e.g., dust) from entering the sealed internal cavity 314 through the front optical ports 160 and 162. Additionally, because of the close positioning of the cover 142 and the shutter door 280, the cover 142 may also help prevent contamination (e.g., dust) from entering the sealed internal cavity 314 through the front optical ports 160 and 162. The cover 142 also prevents contamination (e.g., dust) from entering the sealed internal cavity 314 through the aperture 180 (see FIGS. 7-9). The sealed internal cavity 314 includes portions of the first and second through-channels 170A and 170B. The support portion 242 prevents contamination (e.g., dust) from exiting the sealed internal cavity 314 through the first and second through-channels 170A and 170B in the directions of the rear optical ports 164 and 166, respectively. Likewise, the support portion 242 prevents contamination (e.g., dust) from entering the sealed internal cavity 314 through portions of the first and second through-channels 170A and 170B adjacent the rear optical ports 164 and 166, respectively.

Referring to FIG. 2, the biasing member 282 is compressed between the cover 142 and the shutter door 280 and applies an outwardly directed biasing force to the shutter door 280. Referring to FIG. 14, the biasing force may bias the outwardly facing contacting surface 312 of the shutter door 280 against the inwardly facing contacting surface 178 of the doorjambs 174 and 176 (see FIGS. 8 and 9) with significant closure force to assure compliance with IEC 60529 IP5X dust protection levels. Thus, referring to FIG. 5, the seal may block air from the external environment from flowing into the sealed internal cavity 314 of the main housing 140 through the front optical ports 160 and 162 (see, e.g. FIG. 3). This helps prevent dust ingress over time when compared to traditional protective devices (e.g., the dust cap 148 illustrated in FIG. 4), which may fall out during transportation and handling. Such protective devices are often not replaced when a technician moves, adds, and/or changes the optical connector(s) connected to the prior art fiber optic adapter. Contamination of the optical interfaces is one of the most significant challenges to ensuring optical signal integrity that require troubleshooting and impede viability of optical channel(s).

Referring to FIG. 5, the pivot pins 300A and 300B (see FIGS. 7 and 14-16) of the shutter door 280 are positioned near the underside 236 of the closure portion 240 of the cover 142. However, the pivot pins 300A and 300B are spaced apart from the closure portion 240 so that the pivot pins 300A and 300B are allowed to rotate with respect to the cover 142. The cover 142 and/or the main housing 140 also prevent contamination (e.g., dust) from traveling between the pivot pins 300A and 300B and the underside 236 of the cover 142 and into the sealed internal cavity 314.

The shutter door 280 is configured to transition from the closed position (see FIGS. 3, 5, and 7) to the open position (see FIGS. 2 and 6) when a user installs at least one of the first and second fiber optic connectors 121 (see FIGS. 1 and 13) and 122 (see FIGS. 1 and 2) into the front optical ports 160 (see FIGS. 3, 4, 7, and 8) and 162, respectively. For example, the shutter door 280 may swing or rotate out of the way (without additional user intervention) when the user installs the first and second fiber optic connectors 121 and 122. The first and second fiber optic connectors 121 and 122 must be inserted with sufficient force to overcome the outwardly directed biasing force applied to the shutter door 280 by the biasing member 282. Also, as explained above, when the first and second fiber optic connectors 121 and 122 are inserted into the front optical ports 160 and 162, respectively, the shutter door 280 does not contact the end faces 136 (see FIGS. 1, 2, and 13) of the ferrules 134 (see FIGS. 1, 2, and 13) of the first and second fiber optic connectors 121 and 122 and avoids transferring contamination and/or causing damage to the end faces 136.

Referring to FIG. 15, the inwardly facing surface 286 has a recess 330 that extends downwardly from the through-hole 304. Optionally, the inwardly facing surface 286 may include spacer projections 332A and 332B. The spacer projections 332A and 332B are configured to contact the underside 236 (see FIGS. 2, 5, 6, and 11) of the cover 142 (see FIGS. 2-6, 11, and 12) when the shutter door 280 is in the open position (see FIGS. 2 and 6).

The shutter door 280 may be constructed (e.g., molded) from a polymer. The polymer may be configured to be highly visible so that it may be easily be seen by a technician. For example, the polymer from which the shutter door 280 is made may be a different color than the rest of the duplex fiber optic adapter 102. For instance, the shutter door 280 may be constructed from a white material, for easy viewing by a technician, and the rest of the duplex fiber optic adapter 102 may non-white. Referring to FIG. 3, when the shutter door 280 is visible, it signifies that the front optical ports 160 and 162 are safe and protected.

The polymer from which the shutter door 280 is made may also be at least somewhat translucent such that the polymer blocks laser energy but, at same time, may be illuminated by a visual fault locater ("VFL"). A VFL is a visible red laser designed to inject visible light energy into a fiber optic transmission path (see FIG. 1). Sharp bends, breaks, faulty connectors, and other faults along the transmission path will cause the emission of red light from the transmission path allowing technicians to visually spot the defects. Referring to FIG. 3, having the shutter door 280 illuminate when a VFL is applied is thus useful for fiber tracing, fiber identification, and may simplify fiber polarity verification.

Many prior art fiber optic adapters have polarity designators positioned on the front of the adapter housing near the optical ports. Unfortunately, such polarity designators are typically small and hard to see in most applications without magnification and/or additional lighting. Other prior art fiber optic adapters have polarity designators positioned on the top and/or bottom surfaces where viewing is not possible when the adapters are installed (e.g., in a panel or plate).

Referring to FIG. 3, the outwardly facing surface 284 of the shutter door 280 is easily visible to a technician even from a distance. Thus, the outwardly facing surface 284 may provide ideal locations for polarity designations A3 and B3. For example, the polarity designations A3 and B3 may be molded into the outwardly facing surface 284 of the shutter door 280. As shown in FIG. 3, the polarity designations A3 and B3 may be large enough to fill the front optical ports 160 and 162 and are easier to read than polarity designators included in prior art fiber optic adapters. In the embodiment illustrated, the polarity designations A3 and B3 have been implemented as letters "A" and "B," which are positioned within the front optical ports 160 and 162, respectively. The letter "B" may designate transmit ("Tx"), and the letter "A" may designate receive ("Rx"). Clearly visible polarity designators (like the polarity designations A3 and B3) help the technician ensure that the right patch cable polarity, transmit signal (Tx) at one end of the cable matches the corresponding receiver (Rx) at the other end of the cable.

Referring to FIG. 4, together, the cover 142 and the shutter assembly 146 resist excessive pull forces applied to one or both of the first and second fiber optic connectors 121 (see FIGS. 1 and 13) and 122 (see FIGS. 1 and 2) when they are connected to the duplex fiber optic adapter 102. For example, the cover 142 and the shutter assembly 146 may be configured to resist more than 60 Newtons of pull force applied to one or both of the first and second fiber optic connectors 121 and 122. The locking projections 306A and 306B (the first latch catch) and the locking projections 306C and 306D (the second latch catch) transmit a forward directed pull force (applied by the first and second fiber optic connectors 121 and 122 illustrated in FIG. 1) to the shutter door 280. The pivot pins 300A and 300B (see FIGS. 7 and 14-16) of the shutter door 280 transmit at least a portion of the forward directed pull force to the forward overhang portions 183 (see FIG. 10) of the sockets 182A and 182B (see FIGS. 7-9) of the main housing 140. The shutter door 280 may also transmit a portion of the forward directed pull force to the cover 142 (e.g., via the biasing member 282 and/or the spacer projections 332A and 332B). Thus, at least a portion of the forward directed pull force may be redirected upwardly, which the locking apertures 246A and 246B resist and help stabilize. In other words, the locking apertures 246A and 246B are configured to maintain their connections with the first and second tabs 190A and 190B, respectively.

Referring to FIG. 15, in the embodiment illustrated, the biasing member 282 has been implemented as a low-profile leaf spring. The biasing member 282 has a first spring portion 350 that bears against the inwardly facing surface 286 of the shutter door 280 and a second spring portion 352 that bears against the underside 236 (see FIGS. 2, 5, 6, and 11) of the closure portion 240 (see FIGS. 2, 4-6, 11, and 12) of the cover 142 (see FIGS. 2-6, 11, and 12). In the embodiment illustrated, the first spring portion 350 is configured to be positioned in the recess 330 and the second spring portion 352 is configured to be positioned inside the recess 238 (see FIG. 16). The recesses 238 and 330 may help ensure that the biasing member 282 remains in place and does not move laterally within the duplex fiber optic adapter 102. As shown in FIG. 16, an intermediate portion 354 extends through the through-hole 304 and wraps around the upper portion 288 of the shutter door 280.

The biasing member 282 provides ample closure force and presses downwardly on the upper portion 288, which presses the pivot pins 300A and 300B into the sockets 182A and 182B (see FIGS. 7-9), respectively, formed in the main housing 140 of the duplex fiber optic adapter 102 (see FIGS. 2-10). The biasing member 282 also biases the shutter door 280 toward the closed position (see FIGS. 3, 5, and 7) and presses the outwardly facing contacting surface 312 of the shutter door 280 against the inwardly facing contacting surfaces 178 of the doorjambs 174 and 176 (see FIGS. 8 and 9) of the main housing 140. This pressure blocks airflow and dust particle ingress. Thus, as the first and second fiber optic connectors 121 and 122 are removed from the duplex fiber optic adapter 102, the biasing member 282 applies the outwardly directed biasing force to the shutter door 280 that automatically biases the shutter door 280 into the closed position (see FIGS. 3, 5, and 7). On the other hand, when at least one of the first and second fiber optic connectors 121 and 122 is inserted into the duplex fiber optic adapter 102 with sufficient force to overcome the biasing force, the shutter door 280 rotates about the pivot pins 300A and 300B into the open position (see FIGS. 2 and 6).

The biasing member 282 illustrated requires less space than coil springs used in prior art shuttered adapters and is more durable, supporting far more insertion cycles than prior art shuttered adapters. The biasing member 282 is also easier than a coil spring to handle and assemble with other mating components. The shutter door 280 may be combined with the biasing member 282 to form the shutter assembly 146 in batches in preparation for final assembly of the duplex fiber optic adapter 102.

Alternate Embodiment

Figure 17:
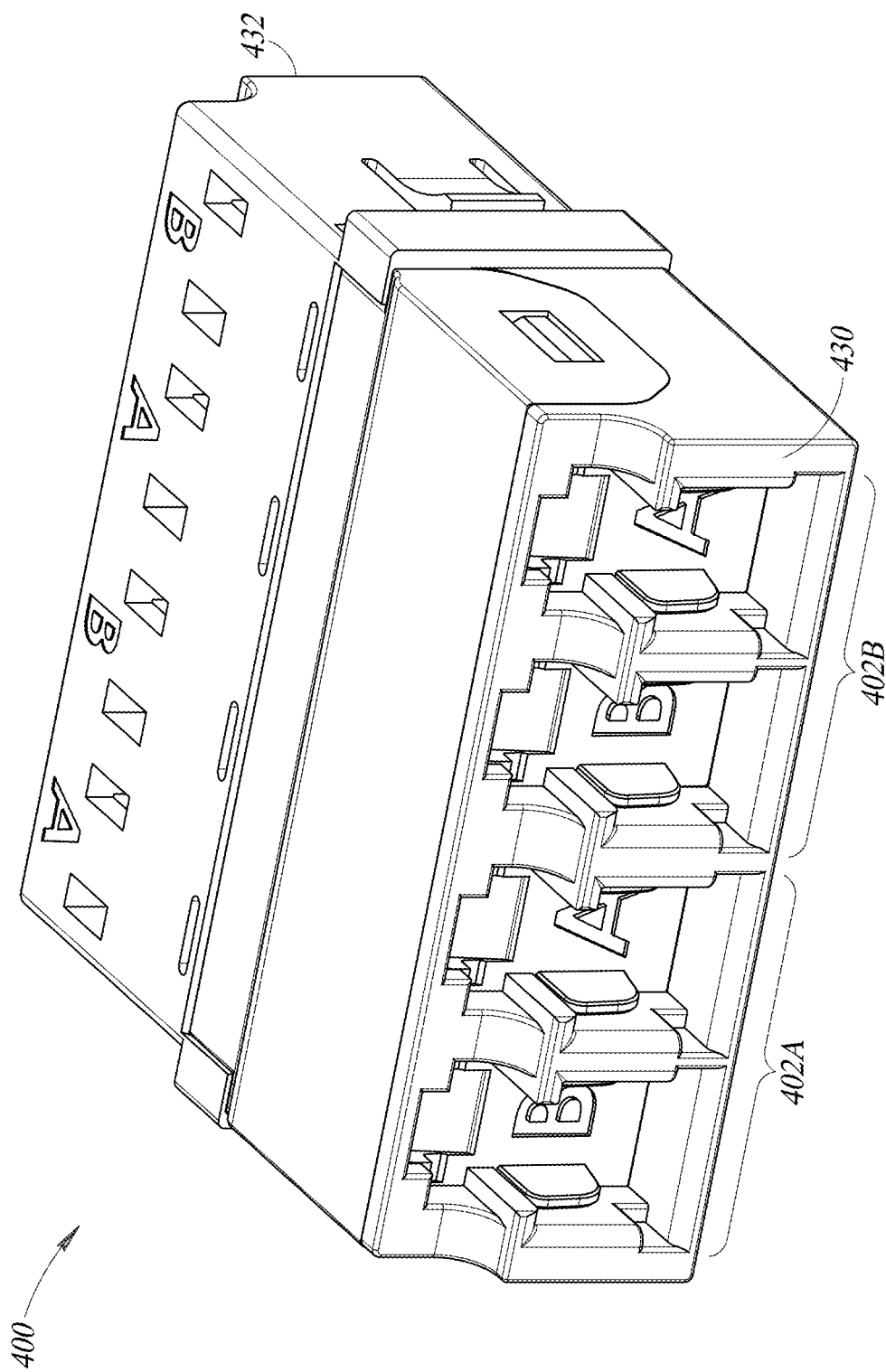
FIG. 17 is a front perspective view of a quad fiber optic adapter.

FIG. 17 is a perspective view of a quad fiber optic adapter 400 that may be characterized as including two duplex fiber optic adapters 402A and 402B arranged side-by-side. The quad fiber optic adapter 400 has a forward facing shutter end 430 opposite a backward facing end 432. The shutter end 430 is configured to receive a first set of four fiber optic connectors (not shown) each like the first fiber optic connector 121 (see FIGS. 1 and 13). The first set of four fiber optic connectors (not shown) may be components of a first pair of duplexed fiber optic connectors (not shown) each like the first duplexed fiber optic connector C1 (see FIG. 1). In other words, at the shutter end 430, the first duplex fiber optic adapter 402A may receive a first duplexed fiber optic connector and the second duplex fiber optic adapter 402B may receive a second duplexed fiber optic connector. The backward facing end 432 is configured to receive a second set of four fiber optic connectors (not shown) each like the fiber optic connector 123 (see FIGS. 1 and 13). The second set of four fiber optic connectors (not shown) may be components of a pair of duplexed fiber optic connectors (not shown) each like the second duplexed fiber optic connector C2 (see FIG. 1). In other words, at the backward facing end 432, the first duplex fiber optic adapter 402A may receive a third duplexed fiber optic connector and the second duplex fiber optic adapter 402B may receive a fourth duplexed fiber optic connector.

Figure 18:
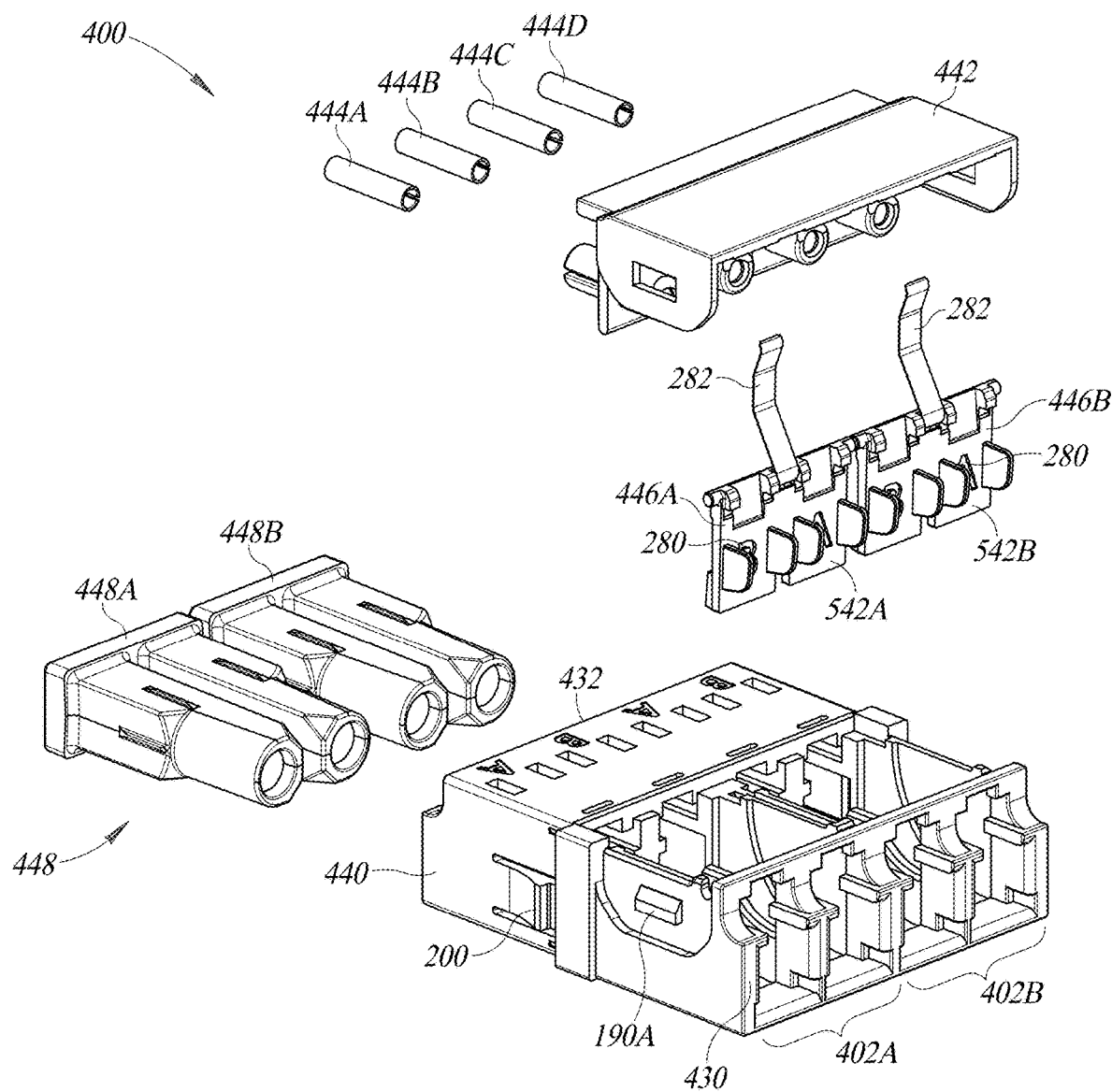
FIG. 18 is an exploded view of the quad fiber optic adapter.
Figure 19:
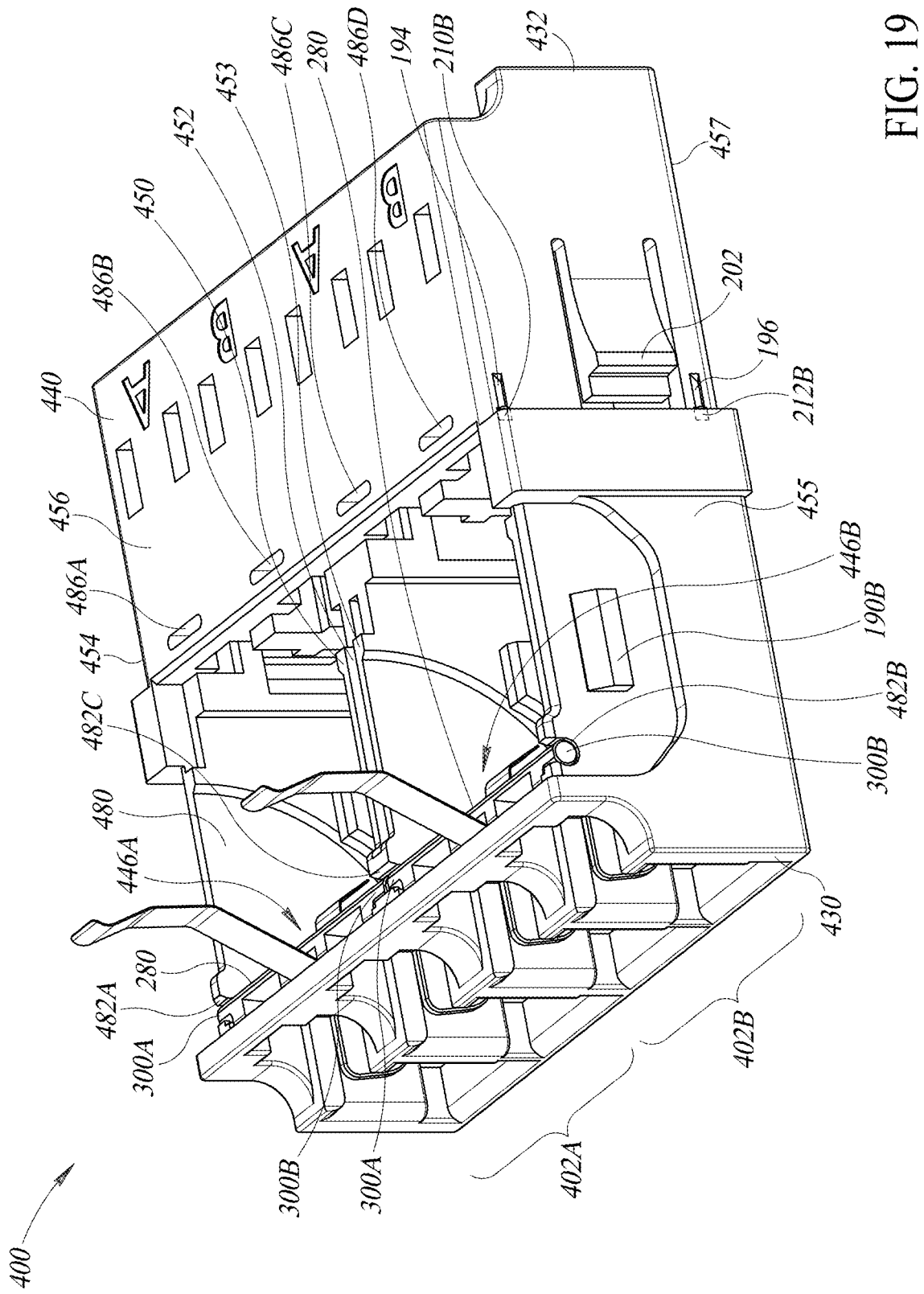
FIG. 19 is a top perspective view of the quad fiber optic adapter omitting its cover.

Referring to FIG. 18, the quad fiber optic adapter 400 includes a main body or housing 440, a cover 442, four floating alignment sleeves 444A-444D, and a pair of shutter assemblies 446A and 446B. Each of the four floating alignment sleeves 444A-444D is substantially identical to the floating alignment sleeve 144A (see FIGS. 4 and 13) of the duplex fiber optic adapter 102 (see FIGS. 1-7). Additionally, each of the shutter assemblies 446A and 446B is substantially identical to the shutter assembly 146 (see FIGS. 4 and 14-16) of the duplex fiber optic adapter 102. Thus, each of the shutter assemblies 446A and 446B includes the shutter door 280 and the biasing member 282. Referring to FIG. 19, the shutter assemblies 446A and 446B are components of the duplex fiber optic adapters 402A and 402B, respectively.

Referring to FIG. 18, optionally, the quad fiber optic adapter 400 may include one or more dust caps 448 that is/are removed before the second set of four fiber optic connectors (not shown) are connected to the backward facing end 432 of the quad fiber optic adapter 400. In the embodiment illustrated, the quad fiber optic adapter 400 includes a pair of dust caps 448A and 448B. The dust caps 448A and 448B may each be substantially identical to the dust cap 148 (see FIG. 4). At the backward facing end 432 (see FIG. 19), the dust cap 448A may be inserted into the first duplex fiber optic adapter 402A and the dust cap 448B may be inserted into the second duplex fiber optic adapter 402B.

Referring to FIG. 19, the main housing 440 is substantially similar to the main housing 140 (see FIGS. 2-10) of the duplex fiber optic adapter 102 (see FIGS. 1-7). However, the main housing 440 is wider to accommodate both of the duplex fiber optic adapters 402A and 402B. The main housing 440 includes a partitioning wall 450 that divides the duplex fiber optic adapters 402A and 402B from one another. The partitioning wall 450 includes an upwardly opening recess 452 formed in its upper surface 453. The main housing 440 includes a first side 454 opposite a second side 455 and a top side 456 opposite a bottom side 457.

Sockets 482A and 482B are formed in the first and second sides 454 and 455, respectively. The sockets 482A and 482B are substantially identical to the sockets 182A and 182B (see FIGS. 7-9) of the duplex fiber optic adapter 102. The partitioning wall 450 includes a socket 482C configured to receive both the pivot pin 300B of the shutter door 280 of the duplex fiber optic adapter 402A and the pivot pin 300A of the shutter door 280 of the duplex fiber optic adapter 402B arranged end-to-end. Between the first side 454 and the partitioning wall 450, the interior of the main housing 440 is substantially identical to the interior of the main housing 140 of the duplex fiber optic adapter 102. Similarly, between the second side 455 and the partitioning wall 450, the interior of the main housing 440 is substantially identical to the interior of the main housing 140 of the duplex fiber optic adapter 102.

Figure 20:
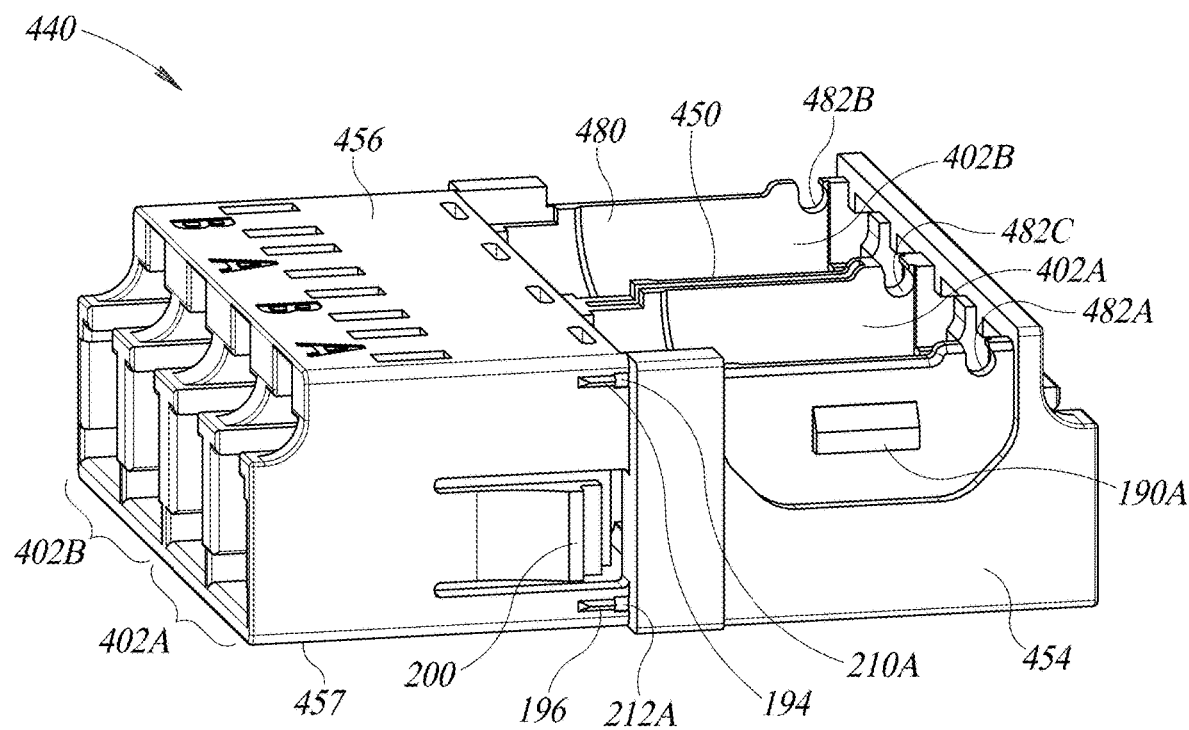
FIG. 20 is a side perspective view of a main housing of the quad fiber optic adapter illustrated from above the main housing.

Referring to FIG. 20, like the first side 154 (see FIGS. 3, 4, and 7-9) of the duplex fiber optic adapter 102 (see FIGS. 1-7), the first side 454 includes the tab 190A, the upper centering rib 194, the lower centering rib 196, the snap latch arm 200, and the recesses 210A and 212A. Similarly, referring to FIG. 19, like the second side 155 of the duplex fiber optic adapter 102, the second side 455 includes the tab 190B, the upper centering rib 194, the lower centering rib 196, the snap latch arm 202, and the recesses 210B and 212B.

The top side 456 includes an aperture 480 that extends between the first and second sides 454 and 455. Thus, the aperture 480 is substantially similar to the aperture 180 (see FIGS. 7-9) of the duplex fiber optic adapter 102 (see FIGS. 1-7). The top side 456 includes windows 486A and 486B that are substantially identical to the windows 186A and 186B (see FIGS. 5, 6, 8, and 9) of the duplex fiber optic adapter 102 and windows 486C and 486D that are substantially identical to the windows 186A and 186B of the duplex fiber optic adapter 102. The windows 486A and 486B may be characterized as being components of the duplex fiber optic adapter 402A and the windows 486C and 486Ds may be characterized as being components of the duplex fiber optic adapter 402B.

Figure 21:
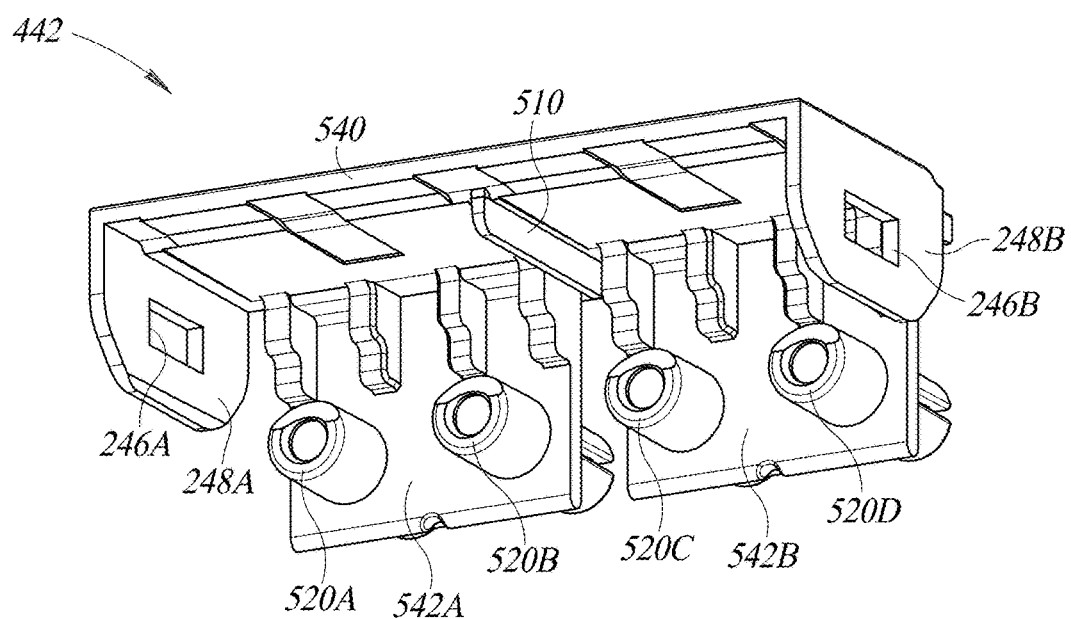
FIG. 21 is a front perspective view of the cover of the quad fiber optic adapter illustrated from below the cover.

Referring to FIG. 21, the cover 442 is substantially similar to the cover 142 (see FIGS. 2-6, 11, and 12) of the duplex fiber optic adapter 102 (see FIGS. 1-7). However, the cover 442 has a closure portion 540 that is wider than the closure portion 240 (see FIGS. 2, 4-6, 11, and 12) to cover the aperture 480 (see FIGS. 19 and 20). Additionally, support portions 542A and 542B extend downwardly from the closure portion 540. The support portions 542A and 542B are each substantially identical to the support portion 242 (see FIGS. 4-6, 11, and 12) of the duplex fiber optic adapter 102. The support portions 542A and 542B are spaced apart laterally from one another. Referring to FIG. 18, the support portions 542A and 542B are part of the duplex fiber optic adapters 402A and 402B, respectively. In the embodiment illustrated in FIG. 21, a divider 510 extends downwardly from the closure portion 540 between the support portions 542A and 542B. The support portion 542A has cylinders 520A and 520B that are substantially identical to the cylinders 220A and 220B, respectively. Similarly, the support portion 542B has cylinders 520C and 520D that are substantially identical to the cylinders 220A and 220B, respectively. The cylinders 520A-520D are configured to fully receive and retain the floating alignment sleeves 444A-444D, respectively. In other words, the cover 442 may be characterized as being an alignment sleeve holder.

Figure 22:
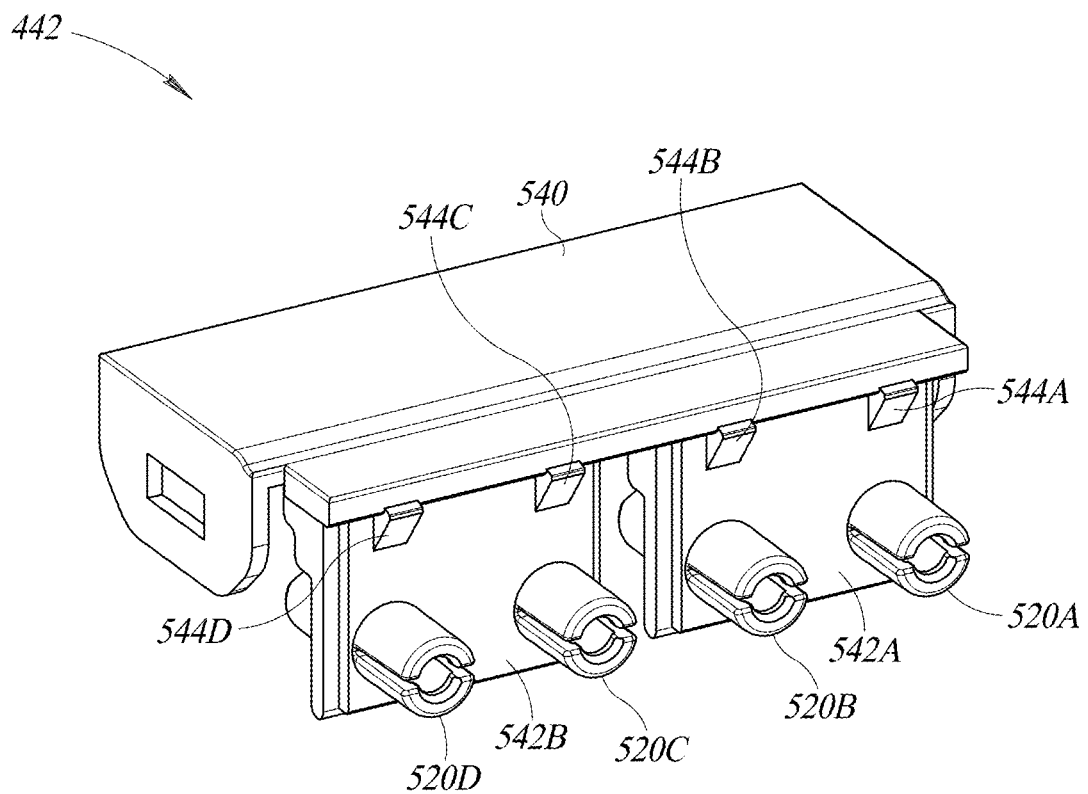
FIG. 22 is a rear perspective view of the cover of the quad fiber optic adapter illustrated from above the cover.

Referring to FIG. 22, the cover 442 includes rearward extending locking projections 544A-544D. The locking projections 544A and 544B extend rearwardly from the support portion 542A and are substantially identical to the locking projections 244A and 244B (see FIG. 12) of the duplex fiber optic adapter 102 (see FIGS. 1-7). Like the windows 186A and 186B (see FIGS. 5, 6, 8, and 9), the windows 486A and 486B (see FIG. 19) are configured to allow the main housing 440 to flex temporarily to accept the locking projections 544A and 544B.

Similarly, the locking projections 544C and 544D extend rearwardly from the support portion 542B and are substantially identical to the locking projections 244A and 244B of the duplex fiber optic adapter 102. Like the windows 186A and 186B, the windows 486C and 486D (see FIG. 19) are configured to allow the main housing 440 to flex temporarily to accept the locking projections 544C and 544D.

Referring to FIG. 21, like the cover 142 (see FIGS. 2-6, 11, and 12), the cover 442 includes the locking apertures 246A and 246B formed in the sidewalls 248A and 248B, respectively. The locking apertures 246A and 246B are configured to receive the tabs 190A (see FIGS. 7, 9, 18, and 20) and 190B (see FIGS. 3, 4, 8, 10, and 19), respectively, of the main housing 440. Together, the locking projections 544A-544D and the locking apertures 246A and 246B may permanently affix the cover 442 to the main housing 440. Referring to FIG. 18, the upwardly opening recess 452 (see FIG. 19) formed in the partitioning wall 450 (see FIGS. 19 and 20) receives the divider 510 (see FIG. 21) when the cover 442 is attached to the main housing 440.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A fiber optic adapter comprising:
  a housing defining an open-ended first through-channel having a first port at a first end and a second port at a second end opposite the first end, the first and second ports being configured to receive first and second fiber optic connectors, respectively, the housing comprising an aperture opening into the first through-channel laterally;
  a cover comprising a cylinder with a bore;
  an alignment sleeve positioned inside the bore, the alignment sleeve comprising an open-ended second through-channel configured to receive a first ferrule of the first fiber optic connector and a second ferrule of the second fiber optic connector, the cover positioning the cylinder inside the first through-channel, the cover comprising a closure portion that closes the aperture of the housing;
  a shutter door adjacent the first port, the shutter door being movable between an open position and a closed position; and
  a biasing member configured to bias the shutter door toward the closed position, the shutter door being configured to be automatically transitioned to the open position when the first fiber optic connector is inserted into the first port and to be automatically transitioned to the closed position by the biasing member when the first fiber optic connector is removed from the first port.

2. The fiber optic adapter of claim 1, wherein the shutter door comprises first and second pivot pins,
  the housing comprises first and second sockets configured to receive the first and second pivot pins,
  the first and second pivot pins are rotatable in the first and second sockets, and
  the shutter door rotates about the first and second pivot pins when the shutter door moves between the open position and the closed position.

3. The fiber optic adapter of claim 1, wherein the housing comprises a doorjamb configured to abut a peripheral portion of the shutter door and form a seal therewith when the shutter door is in the closed position.

4. The fiber optic adapter of claim 1, wherein the shutter door comprises at least one locking projection configured to engage an outwardly extending latch arm of the first fiber optic connector, and
  the at least one locking projection helps maintain at least a portion of the first fiber optic connector inside the first through-channel.

5. The fiber optic adapter of claim 1, wherein the shutter door comprises an outward facing surface with at least one engagement projection extending outwardly therefrom,
  the at least one engagement projection is configured to engage a front portion of the first fiber optic connector when the first fiber optic connector is inserted into the first port,
  the at least one engagement projection is configured to avoid contacting an end face of a ferrule of the first fiber optic connector when the first fiber optic connector is inserted into the first port, and the at least one engagement projection prevents the outward facing surface of the shutter door from contacting the end face of the ferrule when the first fiber optic connector is inserted into the first port.

6. The fiber optic adapter of claim 1 configured to be inserted into an opening, wherein the housing comprises a first side opposite a second side,
the first and second sides comprise first and second latch arms, respectively,
the first and second sides comprise first and second stops spaced apart from the first and second latch arms, respectively,
the first latch arm is configured to snap onto a first side portion defining a first portion of the opening, the first side portion being sandwiched between the first latch arm and the first stop, and
the second latch arm is configured to snap onto a second side portion defining a second portion of the opening, the second side portion being sandwiched between the second latch arm and the second stop.

7. The fiber optic adapter of claim 6, wherein the first side comprises at least one first centering rib configured to be positioned inside the opening,
the second side comprises at least one second centering rib configured to be positioned inside the opening, and
the first and second centering ribs help to maintain the fiber optic adapter inside the opening after the fiber optic adapter has been inserted inside the opening.

8. The fiber optic adapter of claim 7, wherein the first side comprises at least one first recess positioned between the at least one first centering rib and the first stop,
the second side comprises at least one second recess positioned between the at least one second centering rib and the second stop, and
the first and second recesses are configured to store debris received from the opening as the fiber optic adapter is inserted inside the opening.

9. The fiber optic adapter of claim 1, wherein the bore comprises an opening and the fiber optic adapter further comprises:
a removable dust cap having a projecting portion with a channel formed therein, the projecting portion being configured to be received inside the second port, the channel being configured to receive the cylinder and seal the opening into the bore.

10. The fiber optic adapter claim 1, wherein the biasing member is a leaf spring that is compressed between the shutter door and the cover.

11. The fiber optic adapter claim 1, wherein the housing comprises first and second tabs positioned on opposite sides of the housing,
the cover comprises first and second locking apertures configured to receive the first and second tabs, respectively, and form connections therewith,
outwardly directed pull forces applied to the shutter door by the first fiber optic connector are redirected laterally by the shutter door to the cover,
the first and second locking apertures are configured to resist the redirected pull forces applied to the cover and maintain the connections formed with the first and second tabs, respectively.

12. The fiber optic adapter of claim 1, wherein the cover comprises a support portion with a free lower edge,
the cylinder is mounted on the support portion,
the housing has a groove,
the free lower edge is positioned inside the groove,
a sealed internal cavity is defined inside the housing by the cover and the shutter door when the shutter door is in the closed position,
contamination is prevented from entering the sealed internal cavity through the first port by the cover and the shutter door,
contamination is prevented from entering the sealed internal cavity through the aperture by the cover, and
contamination is prevented, by the support portion, from exiting the sealed internal cavity through the first through-channel in a direction of the second port.

13. The fiber optic adapter of claim 1, wherein the shutter door comprises at least one polarity designation.

14. The fiber optic adapter of claim 1, wherein the shutter door is configured to prevent laser light from travel therethrough and the shutter door is configured to be illuminated by light within a visible wavelength spectrum.

15. The fiber optic adapter of claim 1, wherein
the housing defines an open-ended third through-channel having a third port at a first end of the third through-channel and a fourth port at a second end of the third through-channel,
the second end of the third through-channel is opposite the first end of the third through-channel,
the third and fourth ports are configured to receive third and fourth fiber optic connectors, respectively,
the shutter door is adjacent both the first and third ports, and
the shutter door blocks both the first and third ports when the shutter door is in the closed position.

16. A fiber optic adapter comprising:
a housing defining an open-ended first through-channel having a first port at one end and a second port at another end, the first and second ports being configured to receive first and second fiber optic connectors, respectively, the housing comprising an aperture opening into the first through-channel laterally;
a cover comprising a cylinder with a bore, the cover positioning the cylinder inside the first through-channel; and
an alignment sleeve positioned inside the bore, the alignment sleeve comprising an open-ended second through-channel configured to receive a first ferrule of the first fiber optic connector and a second ferrule of the second fiber optic connector, the cover comprising a closure portion that closes the aperture of the housing.

17. The fiber optic adapter of claim 16, wherein the bore has a first opening opposite a second opening,
the first and second openings have first and second diameters, respectively,
the bore has a third diameter positioned between the first and second openings,
the first and second diameters are smaller than the third diameter and trap the alignment sleeve inside the bore, and
the third diameter is configured to allow the alignment sleeve to float inside the bore.

18. The fiber optic adapter of claim 16, wherein the cylinder has at least one slot extending from the second opening of the bore toward the first opening, and
the at least one slot being configured to enlarge when the alignment sleeve is inserted into the second opening thereby enlarging the second opening and allowing the alignment sleeve to pass through the second opening and into the bore.

19. The fiber optic adapter of claim 16, wherein the cover comprises a support portion with a free lower edge, the cylinder is mounted on the support portion,
the housing has a groove, and
the free lower edge is positioned inside the groove.

20. The fiber optic adapter of claim 19, wherein the support portion comprises first and second edge portions,
the housing comprises first and second stop walls each facing toward the first port, and
the first and second edge portions bearing against the first and second stop walls, respectively.

21. The fiber optic adapter of claim 19, wherein the support portion extends into the housing from the closure portion and positions the cylinder inside the first through-channel.

* * * * *